(12) United States Patent
Harding et al.

(10) Patent No.: US 11,873,748 B2
(45) Date of Patent: Jan. 16, 2024

(54) FLUID CHAMBER THERMAL MANAGEMENT SYSTEM AND/OR METHOD

(71) Applicant: Echeneidae Inc., San Francisco, CA (US)

(72) Inventors: Eric Harding, San Francisco, CA (US); Christina Reynolds, San Francisco, CA (US); Mugdha Mittal, San Francisco, CA (US); Kole McGinn, San Francisco, CA (US); Grace Hankes, San Francisco, CA (US)

(73) Assignee: Echeneidae Inc., Wixom, MI (US)

( * ) Notice: Subject to any disclaimer, the term of this patent is extended or adjusted under 35 U.S.C. 154(b) by 0 days.

(21) Appl. No.: 18/045,953

(22) Filed: Oct. 12, 2022

(65) Prior Publication Data

US 2023/0110734 A1  Apr. 13, 2023

Related U.S. Application Data

(60) Provisional application No. 63/307,449, filed on Feb. 7, 2022, provisional application No. 63/307,443, filed
(Continued)

(51) Int. Cl.
| | |
|---|---|
| *B01D 53/02* | (2006.01) |
| *F01N 3/08* | (2006.01) |
| *F01N 13/18* | (2010.01) |
| *B01D 53/04* | (2006.01) |
| *B01D 53/047* | (2006.01) |

(52) U.S. Cl.
CPC ....... *F01N 3/0857* (2013.01); *B01D 53/0407* (2013.01); *B01D 53/047* (2013.01); *B01D 53/0462* (2013.01); *B01D 53/0476* (2013.01); *F01N 3/0871* (2013.01); *F01N 13/1805* (2013.01); *B01D 2253/108* (2013.01); *B01D 2257/504* (2013.01); *B01D 2259/4566* (2013.01)

(58) Field of Classification Search
CPC . F01N 3/0857; F01N 3/0871; B01D 53/0407; B01D 53/0462; B01D 53/047; B01D 53/0476; B01D 2253/108; B01D 2257/504
See application file for complete search history.

(56) References Cited

U.S. PATENT DOCUMENTS

| | | | |
|---|---|---|---|
| 3,613,256 A | 10/1971 | Vexelman et al. | |
| 5,298,226 A * | 3/1994 | Nowobilski | B01D 53/0446 422/177 |

(Continued)

OTHER PUBLICATIONS

PCT, International Search Report and Written Opinion of the International Searching Authority for Application PCT/US22/77954 dated Jan. 17, 2023.

*Primary Examiner* — Christopher P Jones
(74) *Attorney, Agent, or Firm* — Patterson + Sheridan, LLP

(57) ABSTRACT

The fluid chamber system can include: a chamber housing, a capture medium, an internal support structure, and/or any other suitable components. The system can optionally include a thermal management system. However, the system can additionally or alternatively include any other suitable set of components. The system preferably functions to direct an input fluid (e.g., vehicle exhaust) through the capture medium and/or harvest one or more target species (e.g., carbon dioxide) from the input fluid (e.g., vehicle exhaust).

20 Claims, 21 Drawing Sheets

Related U.S. Application Data on Feb. 7, 2022, provisional application No. 63/254,902, filed on Oct. 12, 2021.

(56) References Cited

U.S. PATENT DOCUMENTS

| | | | | |
|---|---|---|---|---|
| 5,298,231 | A | * | 3/1994 | Rockenfeller ......... B01D 53/34 95/137 |
| 6,086,659 | A | * | 7/2000 | Tentarelli ............... B01J 8/0411 96/151 |
| 6,280,508 | B1 | | 8/2001 | Garrett et al. |
| 2003/0190509 | A1 | * | 10/2003 | Byron, Jr. ......... H01M 8/04164 429/129 |
| 2005/0061301 | A1 | * | 3/2005 | Meiller .............. F02M 25/0854 123/519 |
| 2007/0125235 | A1 | * | 6/2007 | Begley ...................... B63J 2/02 96/147 |
| 2009/0056827 | A1 | * | 3/2009 | Tschantz ............ B01D 53/0415 96/108 |
| 2009/0151560 | A1 | | 6/2009 | Adams et al. |
| 2009/0211448 | A1 | * | 8/2009 | McClain ............. A61M 16/101 96/111 |
| 2011/0206581 | A1 | * | 8/2011 | Ackley ................... B01J 8/008 29/446 |
| 2014/0165569 | A1 | | 6/2014 | Hsu |
| 2015/0360172 | A1 | | 12/2015 | Deptala |
| 2020/0346162 | A1 | * | 11/2020 | Fowler ............... B01D 53/0473 |
| 2021/0253456 | A1 | * | 8/2021 | Johnson ............. B01D 53/1475 |
| 2023/0015857 | A1 | * | 1/2023 | Miller ....................... A61L 9/22 |
| 2023/0027070 | A1 | * | 1/2023 | Malik ................. F25J 3/04303 |

\* cited by examiner

FLUID CHAMBER THERMAL MANAGEMENT SYSTEM AND/OR METHOD

CROSS REFERENCE TO RELATED APPLICATIONS

This application claims the benefit of U.S. Provisional Application Ser. No. 63/307,449, filed 7 Feb. 2022, U.S. Provisional Application Ser. No. 63/307,443, filed 7 Feb. 2022, and U.S. Provisional Application Ser. No. 63/254,902, filed 12 Oct. 2021, each of which is incorporated herein in its entirety by this reference.

This application is related to U.S. application Ser. No. 18/045,986, titled "FLUID CHAMBER SYSTEM," filed 12 Oct. 2022, which is incorporated herein in its entirety by this reference.

TECHNICAL FIELD

This invention relates generally to the carbon capture field, and more specifically to a new and useful fluid chamber system and/or method for carbon capture.

DESCRIPTION OF THE PREFERRED EMBODIMENTS

Figure 1:
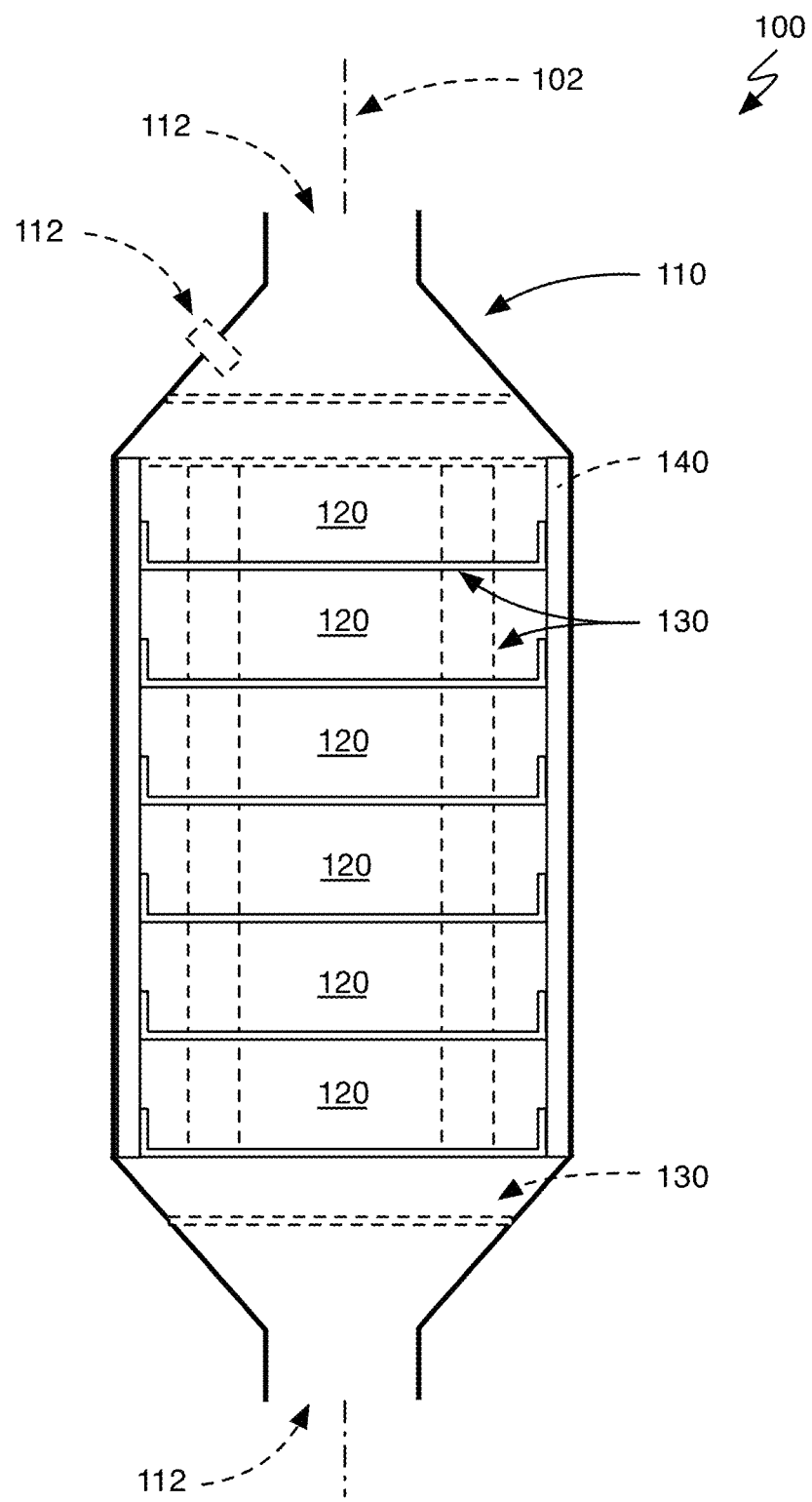
FIG. 1 is a cross-sectional schematic representation of a variant of the fluid chamber system.

The following description of the preferred embodiments of the invention is not intended to limit the invention to these preferred embodiments, but rather to enable any person skilled in the art to make and use this invention.

1. Overview

The fluid chamber system 100 can include: a chamber housing 110, a capture medium 120, an internal support structure 130, and/or any other suitable components. The system can optionally include a thermal management system which includes a set of thermal management components 140. However, the system 100 can additionally or alternatively include any other suitable set of components. The system preferably functions to direct an input fluid (e.g., vehicle exhaust) through the capture medium and/or harvest one or more target species (e.g., carbon dioxide) from the input fluid (e.g., vehicle exhaust).

Additionally or alternatively, the fluid chamber system 100 can function to facilitate a swing adsorption process (e.g., pressure swing adsorption (PSA), vacuum swing adsorption (VSA), temperature swing adsorption (TSA), etc.). For example, the system can facilitate processing by the techniques, processes, and/or system element substantially as described in U.S. application Ser. No. 17/683,832, filed 1 Mar. 2022, titled "SYSTEM AND METHOD FOR MOBILE CARBON CAPTURE", which is incorporated herein in its entirety by this reference.

In variants, the fluid chamber system can be used in conjunction with a method for carbon capture (e.g., mobile carbon capture) which can include: adsorbing a target species (and/or configuring the fluid chamber system to operate in an adsorption mode) and desorbing the target species (and/or configuring the fluid chamber system to operate in a desorption/regeneration mode). However, the fluid chamber system can additionally or alternatively be utilized in conjunction with any other suitable species capture, such as for dehumidification (e.g., capturing water using a desiccant as the capture medium), and/or in conjunction with any other suitable method processes. For example, carbon dioxide ($CO_2$) can be adsorbed from vehicle exhaust gas in the adsorption configuration, and subsequently desorbed by regenerating the capture media, allowing the $CO_2$ to be harvested and stored onboard the chamber. For example, the capture media can be regenerated by conditioning the capture media to achieve a target regeneration/desorption temperature (e.g., via the thermal management system; by heating the system via the thermal management components) in the desorption/regeneration mode and/or a secondary system can vacuum the carbon dioxide from the chamber in the desorption/regeneration mode, which may facilitate capture/storage of $CO_2$ onboard the vehicle. Additionally, variants of the method can utilize a plurality of fluid chambers systems 100 operating in different swing process modes, and alternate adsorption (and regeneration) between the plurality the fluid chambers to facilitate substantially continuous mobile carbon capture (e.g., from a continuous exhaust gas flow/stream; during an entirety of a driving cycle/period, etc.).

In variants, the system can include or be used with (e.g., mounted to) a mobile vehicle platform such as a Class 8 tractor (or semi-truck) or combination tractor-trailer. The fluid chamber system can be configured to connect to the vehicle exhaust pipe(s) (e.g., via an exhaust manifold and/or a fluid manifold) and/or to the tractor frame (e.g., between the rear of the cab and the fifth wheel), but can be otherwise suitably configured. However, the fluid chamber system can alternatively be utilized in any other suitable mobile and/or stationary applications (e.g., such as for a stationary combustion generator), and/or can be otherwise used.

The term "extended surface" and/or "heat transfer surface" as utilized herein preferably refers to a feature which increases a surface area of a component, such as to enhance heat transfer by conduction (e.g., between the component and a solid) and/or convection (e.g., between the component and a fluid). The term "extended surface" can be interchangeably referenced herein with the term "heat transfer surface." Likewise, the term "extended-surface-heat-transfer component" can refer to any component which includes or defines an extended surface. For example, an extended-surface-heat-transfer component can refer to a fin of a heat exchanger, a fin of a heat sink, and/or any other suitable component which defines an extended surface and/or heat transfer surface.

The term "thermal contact" as utilized herein preferably refers to conductive thermal contact and/or conductive heat transfer between components in physical contact. Thermal contact can be direct (e.g., where there is abutment between two physical bodies) or indirect (e.g., by a series of components in contact and configured to transfer heat by conduction). Additionally, thermal contact may be used to refer to a thermal coupling where conduction is the primary mode of heat transfer between two bodies (e.g., by an order of magnitude, etc.), and/or can be otherwise used. Additionally, it is understood that thermal interface materials (TIMs), such as thermal paste, thermal adhesives, thermal gap fillers, and thermally conductive pads, may establish thermal contact and/or facilitate conductive heat transfer between bodies. Thermal contact, as referenced herein, can be established with or without TIMs; and/or the term thermal contact may be otherwise used/referenced. It is understood that heat transfer within the system may additionally or alternatively occur by convection (e.g., forced convection, such as between a working fluid and a thermal management component or heat exchanger; free/natural convection; convection via one or more fluids other than gasses of an ambient environment such as convection via one or more liquids and/or supercritical fluids; convection within heat transfer structures such as heat pipes; etc.) and/or radiation (e.g., without physical contact between bodies).

The term "heat exchanger" as referenced herein preferably refers to a fluid-fluid type heat exchanger (such as a liquid-gas heat exchanger), but can additionally or alternatively refer to a liquid-solid heat exchanger (e.g., where the heat exchanger may facilitate heat transfer between a solid, such as a solid capture medium, and a liquid, such as a working fluid of a thermal management system), gas-solid heat exchanger, and/or any other suitable type of heat exchanger. However, the term heat exchanger can be otherwise suitably utilized or referenced herein.

The term "substantially" as utilized herein can mean: exactly, approximately, within a predetermined threshold or tolerance, and/or have any other suitable meaning.

1.1 Illustrative Examples

In a first set of variants, a fluid chamber system for mobile carbon dioxide ($CO_2$) capture from a vehicle engine exhaust manifold by a swing adsorption process includes: a chamber housing configured to mount to the vehicle, the chamber housing comprising: an inlet port configured to be selectively connected to a vehicle exhaust manifold in an adsorption configuration, and an outlet port configured to selectively vent to an exterior environment in the adsorption configuration; the chamber housing defining a primary axis and an interior between the inlet port and the outlet port; a plurality of baffles arranged within the interior of the chamber housing, wherein each baffle of the plurality spans a chamber housing interior and structurally stiffens the chamber housing across a respective cross section, wherein each baffle of the plurality defines a first plurality of apertures which extend through a baffle thickness; a mesh structure arranged between adjacent pairs of baffles of the plurality, wherein the mesh structure defines a second plurality of apertures; and/or a solid microporous capture medium comprising a bed of solid microporous media elements arranged within the interior.

In a second set of variants, nonexclusive with the first set, a fluid chamber system for swing adsorption processing includes: a chamber housing comprising a first and second port, the chamber housing defining a primary axis and an interior between the first and second ports; an internal support structure arranged within the interior of the chamber housing, the internal support structure includes: a plurality of baffles fixed to the chamber housing, each baffle of the plurality defining a respective broad surface arranged substantially orthogonal to the primary axis, each baffle of the plurality defining a set of apertures which extend through a thickness of the baffle; and a mesh structure arranged between adjacent pairs of baffles of the plurality; and/or a solid microporous capture medium arranged within each region of a set of regions, the set of regions defined and bounded by the chamber wall and the internal support structure (e.g., wherein the internal support structure partitions the chamber interior into a set of regions).

In a third set of variants, nonexclusive with the first and second sets, a fluid chamber system for mobile carbon dioxide ($CO_2$) capture from a vehicle exhaust manifold by a swing adsorption process includes: a chamber housing configured to mount to a vehicle, the chamber includes: a chamber wall, the chamber wall defining a primary axis, a first end, and second end opposite the first end along the primary axis; an inlet port at the first end, the inlet port configured to be selectively connected to a vehicle exhaust manifold in an adsorption configuration; and/or an outlet port at the second end, the outlet port configured to selectively vent to an exterior environment in the adsorption configuration; a plurality of thermal management components comprising at least three (or alternatively, two tubes)

affixed to the chamber housing and arranged within the chamber housing between the first and second ends (e.g., wherein the at least three tubes are not coaxial, wherein none of the tubes are contained and/or otherwise arranged within any of the other tubes, etc.); an internal support structure arranged within the chamber housing, defining a set of extended surfaces, and including a plurality of baffles, wherein each baffle: spans a chamber housing interior and structurally stiffens the chamber housing, contacts each of the at least three tubes at a respective tube exterior, and/or defines a plurality of flow apertures which extend through a baffle thickness; and/or a solid microporous capture medium arranged within the chamber housing interior and bounded by the chamber wall, the plurality of thermal management components, and the internal support structure.

In a fourth set of variants, nonexclusive with the first, second, and third sets, a fluid chamber system for gas separation by a swing adsorption process includes: a chamber housing comprising a first and second port and defining a primary axis; a plurality of thermal management components affixed to the chamber housing and arranged within the chamber housing; an internal support structure, the internal support structure arranged within the chamber housing and forming a set of extended surfaces which are thermally coupled to the plurality of thermal management components, the internal support structure including: a plurality of baffles, each baffle defining a respective set of apertures and through a thickness of the baffle, wherein each adjacent pair of baffles of the plurality of baffles is configured to direct a combined axial-radial flow of an input gas relative to the primary axis, wherein each baffle of the plurality comprises a respective broad surface; and/or a set of internal support components in contact with and protruding from each baffle of the plurality of baffles at the respective broad surface of the baffle; and/or a capture medium arranged within a region bounded by the chamber housing, the plurality of thermal management components, and the plurality of baffles, wherein the solid microporous capture medium thermally contacts both the internal support structure and the thermal management components.

2. Benefits.

Variations of the technology can afford several benefits and/or advantages.

First, variations of this technology can facilitate carbon capture using a solid capture medium, such as porous solid adsorbent (e.g., Zeolite; in bead or pellet form). Utilizing a solid capture medium for species adsorption can provide a number of benefits in different contexts, which may include: facilitating direct carbon dioxide adsorption from a vehicle exhaust flow (e.g., in series with a vehicle engine and/or vehicle exhaust manifold), enabling reduced system complexity, reducing net system cost, improving manufacturability, improving serviceability, improving energy efficiency (and/or overall capture efficiency), and/or any other suitable benefits.

Second, variations can mitigate vibrations using the internal support structure to reduce perturbations of the capture medium, where excessive internal vibration might otherwise degrade or destroy the capture medium (e.g., grind, fracture, and/or pulverize the capture medium, etc.). Such variants can enable vehicle mounting of the system to facilitate carbon capture onboard a vehicle (e.g., diesel or internal combustion vehicle; a Class 8 tractor, etc.), where vehicular vibrations (e.g., related to drive cycles, engine vibration, suspension vibration, etc.) may be transmitted to the chamber housing. As an example, variants can mechanically protect (e.g., prevent degradation and/or destruction of) a solid/pelletized capture medium housed within the fluid chamber and/or can otherwise increase the usable lifetime of the capture medium. Variations can additionally or alternatively improve the vibration/modal characteristics of the system and/or reduce the mass requirements (and associated cost) of the system, such as by utilizing the internal support structure to reinforce the housing of the fluid chamber (e.g., transferring forces/moments through elements of the internal support structure within the interior of the chamber housing).

Third, variations of this technology can improve the thermal characteristics (e.g., required input thermal energy, heat load requirements, etc.) of capture and/or regeneration/desorption of a target species, such as by reducing a net thermal resistance between the capture medium and thermal management components, and/or by utilizing waste heat present in the form of excess thermal energy of the input fluid (e.g., vehicle exhaust at super-ambient temperatures). Such variants can utilize the internal support structure to facilitate thermal conduction across an extended surface area (e.g., relative to heating tubes or heating components) between the capture medium and the internal support structure and/or between the internal support structure and thermal management components (e.g., heating and/or cooling tubes), which can reduce the net thermal resistance between heat sources and sinks in the system. Variants can additionally provide thermal management (e.g., heating and/or cooling) within an interior of the chamber housing, which may reduce heat loss to the ambient surroundings.

Fourth, variations of this technology can improve energy efficiency and/or optimize carbon dioxide capture/regeneration efficiency, such as by allowing the temperature of the capture medium to be maintained within a target temperature range (e.g., during capture, during desorption/regeneration). As an example, efficiency of the system (e.g., energy efficiency, carbon dioxide capture/regeneration efficiency, overall cost efficiency, etc.) can be optimized, during one or more periods of operation (e.g., capture/adsorption, desorption/regeneration, system heating, vehicle driving, vehicle idling, etc.), by maintaining the capture medium at a target temperature of: ambient temperature, less than 50 C, 50 C, 70 C, 80 C, 90 C, 100 C, 120 C, 150 C, 170 C, 180 C, 190 C, 200 C, 210 C, 220 C, 230 C, 240 C, 250 C, 260 C, 280 C, 300 C, 350 C, 400 C, 500 C, greater than 500 C, within any open or closed interval bounded by one or more of the aforementioned values, and/or at any other suitable target temperature(s).

However, variations of the technology can additionally or alternately provide any other suitable benefits and/or advantages.

3. System

The fluid chamber system 100, an example of which is shown in FIG. 1, can include: a chamber housing 110, a capture medium 120, an internal support structure 130, and/or any other suitable components. The system can optionally include a thermal management system. However, the system 100 can additionally or alternatively include any other suitable set of components. The system preferably functions to direct an input fluid (e.g., vehicle exhaust) through the capture medium and/or harvest one or more target species (e.g., carbon dioxide) from the input fluid (e.g., vehicle exhaust).

Additionally or alternatively, the fluid chamber system 100 can function to facilitate a swing adsorption process (e.g., pressure swing adsorption [PSA], vacuum swing adsorption [VSA], temperature swing adsorption [TSA], etc.). For example, the system can facilitate processing by the techniques, processes, and/or system element substantially as described in U.S. application Ser. No. 17/683,832, filed 1 Mar. 2022, titled "SYSTEM AND METHOD FOR MOBILE CARBON CAPTURE", which is incorporated herein in its entirety by this reference.

The chamber housing 110 preferably functions to house and/or contain the other elements of the system; and can additionally or alternatively function to contain gases (e.g., input gas, regeneration gas, etc.) and/or other fluids within the system (e.g., in fluidic contact with the capture medium). The chamber housing preferably defines an interior, in which other elements of the capture module (e.g., the capture medium, internal support structure, etc.) are preferably contained. The chamber housing is preferably configured to operate as a pressure vessel, such as a vessel which can maintain a positive and/or negative internal pressure (e.g., relative to an ambient/exterior pressure). Alternatively, the chamber housing can be unpressurized, configured to operate with a low-pressure differential across the chamber housing (e.g., in a low-pressure setting, with minimal or substantially zero pressure-induced hoop stress, etc.), configured to operate in a negative pressure setting (e.g., radially inward pressure differential, inward-acting hoop stress, vacuum-pressure interior relative to ambient, etc.) and/or otherwise configured. In a specific example, in a desorption mode of operation, the chamber housing is configured to maintain negative internal pressure at the interior relative to an ambient pressure. Additionally or alternatively, the chamber housing can include a port configured to release a desorbed species under a vacuum pressure in a desorption mode/configuration. However, the chamber housing can be otherwise configured and/or can be configured to operate across any suitable pressure range(s).

The chamber housing preferably includes an outer wall which encloses the interior (e.g., the interior extending between the inlet and outlet ports and/or other fluid ports, etc.). The outer wall is preferably (substantially) fluidly impermeable, and can be rigid, semi-rigid, deformable (e.g., elastically deformable within a range of operating pressures), and/or can have any other suitable properties. The outer wall is preferably cylindrical (or substantially cylindrical) about a primary axis 102 (e.g., a central, vertical axis) of the vessel between the ends of the vessel (or a portion thereof), but can otherwise be tapered, conical, and/or define a varying cross-sectional area along the central axis (e.g., such as in cases where the walls deform based on non-uniform stress concentrations within the range of operating pressures of the vessel). Alternatively, the chamber housing can be prismatic (e.g., rectangular, hexagonal, etc.), spherical, oblate, prolate, and/or include any other suitable shape or geometry. The outer wall of the chamber housing can define orthogonal cross sections (e.g., orthogonal to the central axis) which are circular, elliptical, round, polygonal (e.g., regular polygons, irregular polygons), rectangular, square, and/or otherwise shaped. In a first example, the chamber housing can be a pressure cylinder which includes a cylindrical outer wall. In an alternate example, the chamber housing can be a modularized (e.g., with a cross-sectional geometry which may tile a plane; hexagonal, rectangular, etc.), such that an array of chamber housings modules may be arrayed to tile particular cross-sectional area (e.g., such as in an industrial setting, filtering a large input flow, etc.). However, the chamber housing can be otherwise shaped and/or include any other suitable cross-sectional geometry(ies).

Ends (or 'endcaps') of the chamber housing can be conical, hemispherical, semi-elliptical, substantially flat (e.g., orthogonal to the primary axis, flat endcaps, etc.), planar, and/or any other suitable geometry. The chamber housing and/or outer wall is preferably metal (e.g., weldable, steel, aluminum, etc.) but can additionally be constructed from composites, polymers, and/or any other suitable materials. The chamber housing is preferably uninsulated (e.g., exposed to an ambient environment), but can alternatively be insulated and/or protected by any suitable material coating(s). However, the chamber housing can be otherwise suitably constructed.

The chamber housing can include or define a set of fluid ports 112, which function to facilitate fluid ingress and/or egress from the interior. Each port can be an inlet, an outlet, a bidirectional fluid port, operable to switch between any of the aforementioned port types (e.g., acting as an inlet during capture and as an outlet during regeneration), and/or can be otherwise configured. The ports (and/or gas flow elements, such as pipes and/or manifolds connected to the ports) can optionally include or be fluidly coupled to one or more valves (e.g., control valves, check valves, etc.) to control such flow. The set of fluid ports are preferably operable to fluidly couple the housing interior to a gas input (e.g., from a combustion engine), a gas exhaust (e.g., provided to an exhaust stack or tailpipe, venting to atmosphere, etc.), and a regeneration module (e.g., a pressure vessel configured to store the target species, such as a COPV, etc.). In some examples, one or more valves (e.g., as described above) can control such ports and/or fluidic couplings. In variants where the system operates with a swing adsorption process, a pressure drop within the exhaust gas stream is less than 10 kPA between the inlet port and the outlet port in the adsorption configuration (e.g., which may avoid exceeding vehicle exhaust backpressure constraints). For example, the pressure drop between the inlet port and the outlet port (and/or a backpressure of the system) can be: less than 0.1 kPA, 0.5 kPA, 1 kPA, 2 kPA, 4 kPA, 6 kPA, 10 kPA, greater than 10 kPA, any open or closed range bounded by the aforementioned values, and/or any other suitable pressure difference, which may facilitate operation of the system on a vehicle (e.g., mitigating hinderance to vehicle/engine operational efficiency).

In one example, the chamber housing can include a first and second port at opposing ends of a primary axis (e.g., vertical axis) of the chamber housing. For example, the inlet and outlet ports can be arranged at opposing ends of a central axis of a cylindrical chamber housing (e.g., at the top and bottom ends, for example). Alternatively, multiple ports can be arranged at the same end of the chamber housing (e.g., exhaust gas inlet and outlet ports can be arranged on the same end of the chamber housing; an exhaust gas inlet and a working fluid inlet of a thermal management system can be arranged at the same end; etc.) and/or can be otherwise suitably arranged. However, the capture module can additionally or alternatively include any other suitable fluid ports with any suitable functionalities.

The size of the chamber housing can be specified based on a target adsorption capacity and/or the application constraints. For example, an outer wall diameter of between 250 mm and 500 mm (e.g., 381 mm) may maximize a $CO_2$ adsorption capacity on a vehicle given the available space (e.g., between the truck cab and the fifth wheel and/or a trailer connected thereto); however, the chamber housing can alternatively have any other suitable size.

However, the system can include any other suitable chamber housing.

The capture medium preferably functions to selectively adsorb one or more target species (e.g., carbon dioxide, water, etc.). The capture medium is preferably a solid material, such as a zeolite material, a metal-organic framework (MOF), activated carbon, desiccant, and/or any other suitable material. The capture medium is preferably substantially porous (e.g., pore sizes of 1-3, 3-10, and/or 10-30 angstroms, etc.), but can additionally or alternatively have any other suitable structure. The capture medium can additionally or alternatively include liquid media and/or any other suitable media. In some examples, the capture medium can include amines (e.g., added to a liquid medium or porous solid medium) which can function to increase storage capacity of the medium.

The capture medium is preferably housed within the interior of the fluid chamber, but can additionally or alternatively be physically constrained by the various structural elements of the system (e.g., such as internal support components, thermal management components, the outer wall of the chamber housing, etc.), which may limit motion of capture media elements, physically retain the capture medium, and/or otherwise constrain (or bound) the capture medium within the interior. Likewise, the capture medium can mechanically and/or thermally contact components within the interior of the fluid chamber (e.g., the internal support structure and/or the thermal management components). In variants, the capture medium can be bounded, limited, retained, and/or constrained within one or more regions within the interior (e.g., where the mesh, baffles, and/or other components within the chamber housing partition the volume into various subregions; where the motion of the capture medium is impeded/constrained along the boundaries by abutment with the various structures; etc.).

In variants, capture medium can include a bed (a.k.a. pelletized bed) formed by a plurality of aggregated beads, pellets, and/or other element geometries (e.g., spherical, ellipsoidal, cuboidal, etc.) of a solid adsorbent. The bed can be homogeneous (e.g., substantially similar materials and/or pellet geometries) or heterogeneous (e.g., elements can have mixed sizes, shapes, materials, etc.). Individual elements/ particulates of an aggregate bed can have a characteristic length (e.g., diameter, pellet length, maximal dimension, etc.) of less than 1 mm, 1 mm, 2 mm, 3 mm, 4 mm, 5 mm, 6 mm, 8 mm, greater than 8 mm, within any suitable open or closed interval bounded by one or more of the aforementioned values, and/or any other suitable characteristic length. Decreasing the size of capture medium elements can advantageously increase the adsorption surface area, improve manufacturability (e.g., of pellets), and/or improve thermal/ structural properties at thermal interfaces (e.g., increasing conduction surface area to volume ratio); however, in some embodiments, such a decrease may also restrict the inlet flow (e.g., exhaust inflow) and/or reduce the fluid permeability of the bed, which may be disadvantageous in some variants. In cases where the inlet flow is in series with an engine and/or fluidly coupled to an engine, overly restricting engine exhaust and/or causing backflow may be detrimental to engine performance. Accordingly, elements can be sized according to various specific implementation characteristics, such as to balance these tradeoffs. In a specific example, elements can be sized with a characteristic length-scale (e.g., width, length, diameter, etc.) of about 3-5 mm, which can yield adequate adsorption without resulting in engine exhaust backflow. In a specific example, individual elements of a solid capture medium can be larger than grid/mesh cells of the interior support structure (e.g., retained at within the interior between the ports of the housing, retained by the cell geometry), but can alternatively be smaller than orifices of the internal support structure (e.g., smaller than orifices in baffles, etc.).

The bed is preferably non-fluidized (e.g., does not exhibit fluid properties when an input fluid, such as vehicle exhaust, flows through it; not a fluidized bed), but can alternatively be fluidized in one or more operating modes (e.g., operate as a fluidized bed, etc.) and/or can be otherwise suitably configured. The bed can be unitary/singular for the chamber housing and/or can be separated into discrete subregions by the internal support structure (e.g., restricting the vibrations, movement, and/or packing of elements). In variants, the baffles and the mesh structure internally separate the bed along axial and radial boundaries, respectively, wherein a first plurality of flow apertures of the baffles and second plurality of flow apertures of the mesh fluidly couple the bed across the axial and radial boundaries, respectively (wherein the axial and radial boundaries are preferably defined with respect to a primary axis of the chamber). For example, axial and radial boundaries can be substantially aligned with an axial and/or radial vector, relative the primary axis (e.g., exactly aligned/parallel, within 1 degree, 3 degrees, 5 degrees, 10 degrees, 15 degrees, 20 degrees, 25 degrees, etc.).

In variants, the internal support structure can be configured to facilitate fluid flow through the bed (within interior of the chamber housing), while restricting the motion and/or dampening vibrations between various regions of the bed (e.g., axially, radially; random motions/vibrations) and/or preventing bed fluidization. In some cases, a non-fluidized bed may increase the number of collisions between the input fluid (and target species therein) and the capture media (e.g., when operating in an adsorption mode), thereby improving adsorption of the target species by the capture media.

In some variants, the capture medium can be a set of solid microporous media elements including zeolite pellets. In some variants, the capture medium can be a solid microporous capture medium which includes a bed of solid microporous pellets or solid microporous beads. In a first example, the bed is non-fluidized and configured to shift internally under influence of external perturbations. Additionally, in the first example, the internal support structure can isolate internal shifts within the bed between a first region and second region of a set of regions bounded by the chamber wall and the internal support structure.

The capture media can additionally or alternatively include a monolithic substrate (e.g., such as a foam substrate with a microporous structure; zeolite monolith; etc.) and/or any other suitable capture media. For example, the monolithic substrate can be unitary between adjacent pairs of baffles (e.g., stacked/interdigitated between baffles, spanning an axial gap between the baffles, etc.). Additionally or alternatively, the monolithic substrates can be separated/ divided among portions of the interior (e.g., into distinct/ separate regions of the interior, such as along boundaries of the interior support structure; separate monolithic structures on opposing sides of a baffle thickness, for example). As an example, the capture medium can include a fixed bed or a monolithic microporous substrate which extends between an adjacent pair of baffles.

However, the system can include any other suitable capture media.

The system can include or be used with a thermal management system which functions to heat (and/or cool) the chamber housing and/or a capture medium therein (e.g., to facilitate desorption (and/or capture) of the target species; during one or more modes of operation; etc.). Additionally or alternatively, the thermal management system can function to maintain the capture medium within a target temperature range.

In variants, the thermal management system can include one or more thermal management components 140 which are arranged within the interior of the chamber housing and function to supply heat to (and/or remove heat from) the interior of the chamber and/or capture medium. Thermal management components can include heating elements (e.g., electrical heaters, resistive heaters, electrical heat pumps, combustion-based heaters, mechanical heat pumps, etc.), heat exchangers (e.g., fluidly coupled to a heated fluid and/or to any other suitable fluid at a temperature greater than the capture medium and/or the ambient environment), and/or any other suitable thermal management components.

Figure 11:
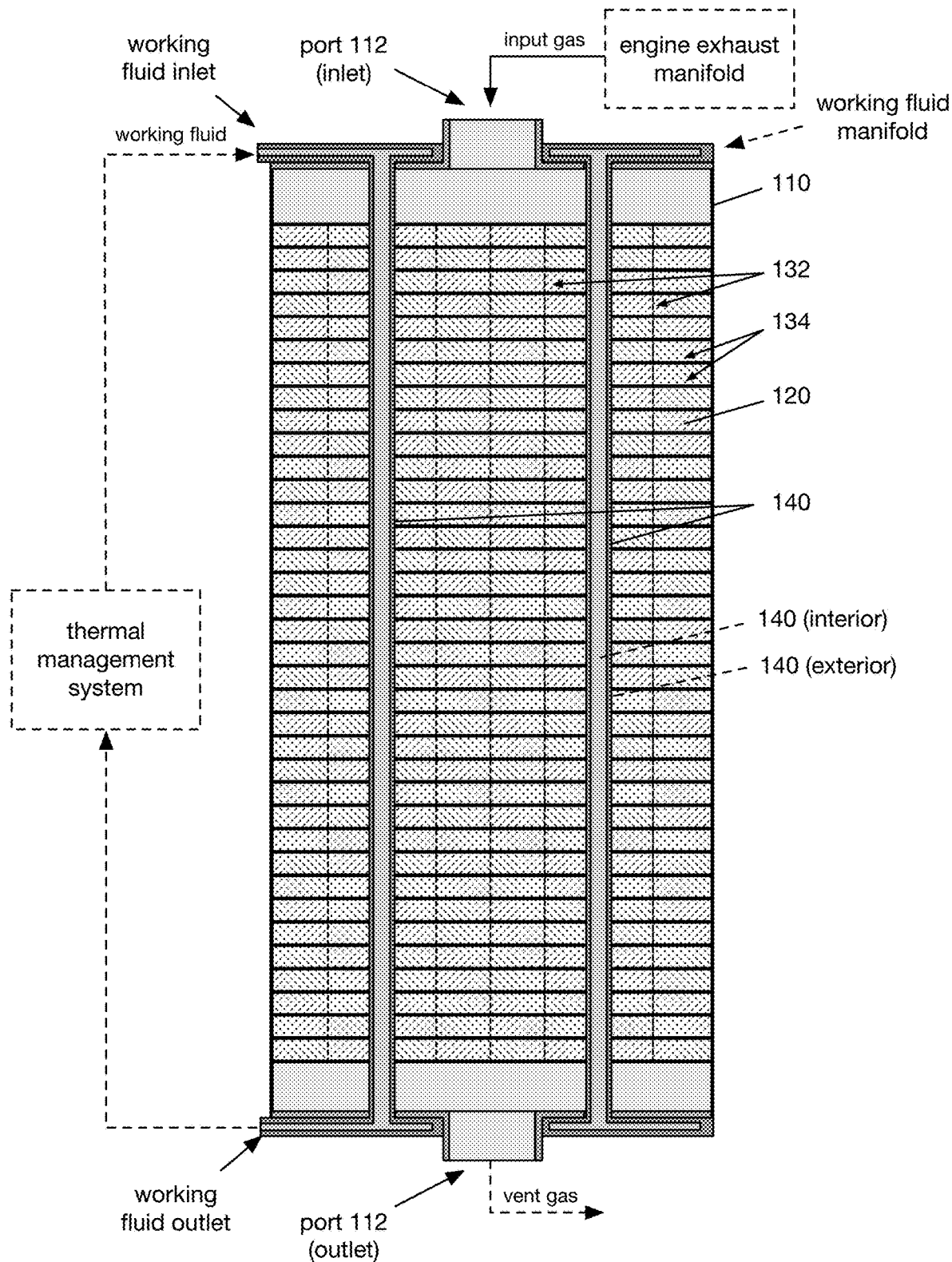
FIG. 11 is a diagrammatic example of a variant of the fluid chamber system.

In one set of variants, the thermal management components can include a set of (heated/cooled) tubes, extending through the interior of the chamber housing, wherein a working fluid (e.g., heated working fluid, such as a heated oil having a temperature greater than a temperature of the chamber housing and/or capture media) is fluidly coupled to the tube interior of the heated tubes and/or regulated by a set of valves and/or a fluid manifold. In an example, the thermal management components can include at least three tubes affixed to the chamber housing and arranged within the chamber housing (e.g., between opposing ends of the chamber housing relative to a primary axis of the chamber housing; wherein the at least three tubes are offset radially inwards from the chamber wall relative to the primary axis in plane with each of a plurality of baffles). The thermal management components can include any suitable number of (heated/cooled) tubes, such as: 1, 2, 3, 5, 7, 9, 12, 18, 24 greater than 24, any open or closed range bounded by the aforementioned values and/or any other suitable number of heated tubes. In variants, thermal management tubes can at least partially enclose a working fluid (e.g., oil, water/glycol, etc.) and/or route the working fluid between a working fluid inlet (and/or inlet manifold) and a working fluid outlet (and/or outlet manifold) of the fluid chamber, an example of which is shown in FIG. 11, as part of the thermal management system. The tubes are preferably arranged in parallel (e.g., between a working fluid inlet and a working fluid outlet, an example of which is shown in FIG. 11), but can additionally or alternatively be connected in series and/or any combination/permutation of series and parallel. As an example, the thermal management system can include a first working fluid manifold (e.g., inlet manifold) which is mounted to and/or integrated into a first end of the chamber housing and a second working fluid manifold (e.g., outlet manifold) which is mounted to and/or integrated into at a second end of the chamber housing (e.g., opposite the first end). The working fluid flow within the tubes can be in a parallel flow (same direction) and/or counterflow (opposite direction) configuration relative to the gas flow within the fluid interior. For example, the fluid flow direction can be downward (e.g., in a direction of a gravity vector; downflow), upward (e.g., substantially opposing a gravity vector; upflow), and/or in any other suitable direction.

Figure 12A:
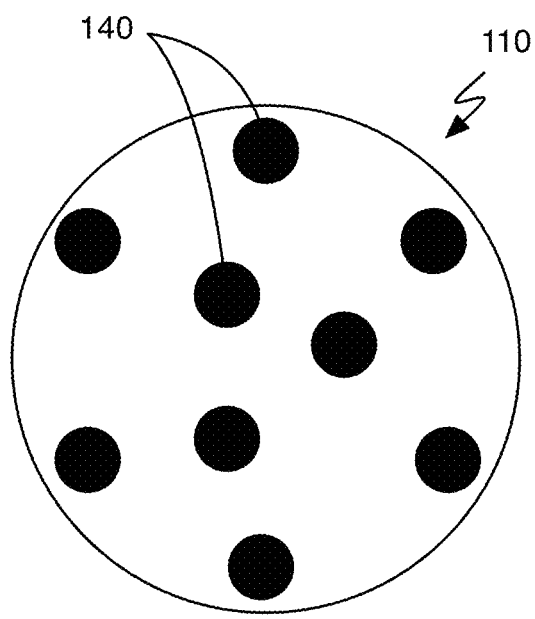
FIGS. 12A-12E are a first, second, third, fourth, and fifth cross-sectional diagrammatic example, respectively, of an arrangement of thermal management components relative to the camber housing in one or more variants of the fluid chamber system, respectively.
Figure 12B:
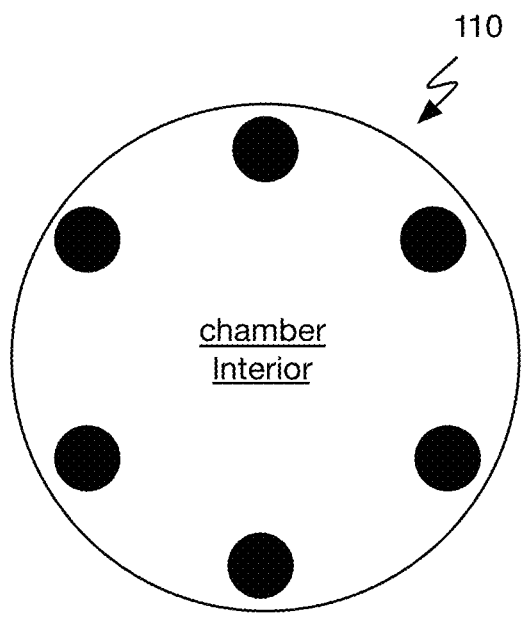
Figure 12C:
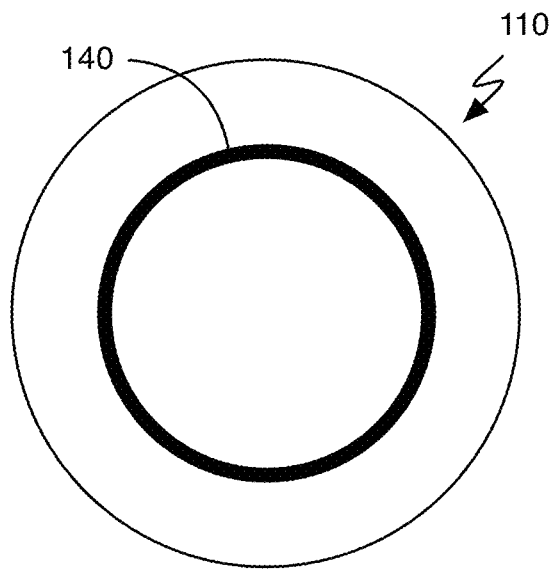
Figure 12D:
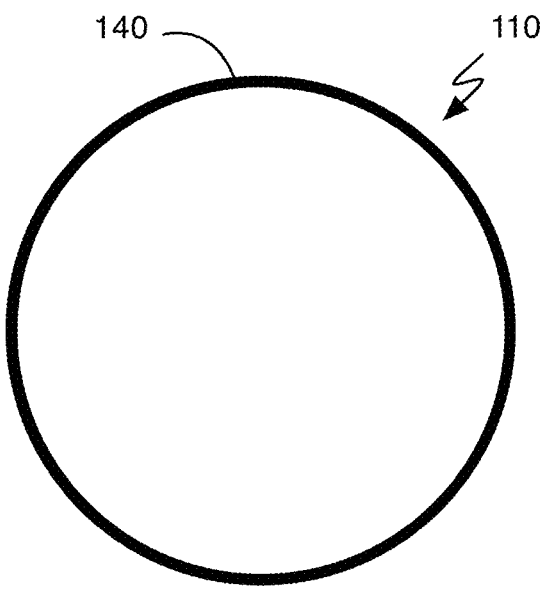
Figure 12E:
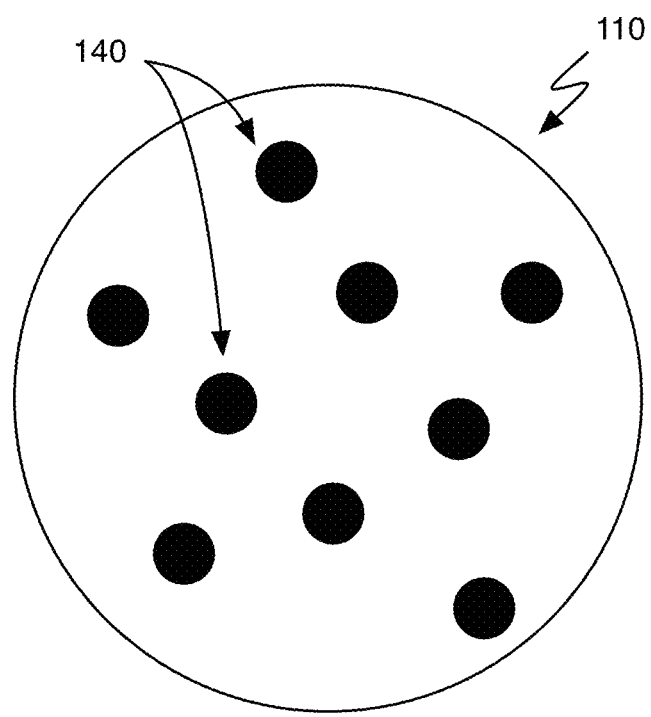

Thermal management components can be distributed throughout the chamber housing (e.g., examples are shown in FIGS. 12A-B), contained within an interior of the chamber housing (e.g., an example is shown in FIG. 12C, a second example is shown in FIG. 12E), arranged at a periphery of the chamber housing (e.g., an example is shown in FIG. 12D), include elements proximal to the outer wall of the chamber housing (e.g., an examples is shown in FIG. 12B; which may be offset from the outer wall of the chamber housing, an example of which is shown in FIG. 12E) and/or not in conductive contact with the outer wall of the chamber housing), include elements proximal to a central axis (e.g., closer to the central axis than the outer wall; an example is shown in FIG. 12A), and/or can be otherwise suitably arranged. Thermal components preferably extend axially (e.g., along the length and/or primary axis of the chamber, or a subset thereof), but can additionally or alternatively be otherwise configured.

In some variants, the chamber housing, internal support structure, and thermal management components can collectively function as a heat exchanger (e.g., gas-fluid type heat exchanger; parallel flow heat exchanger, counterflow heat exchanger, etc.; an example is shown in FIG. 11) of the thermal management system. For example, the thermal management system can be configured to pre-cool an exhaust gas flow from a vehicle engine with a first heat exchanger and re-heat the exhaust gas flow at the fluid chamber system, acting as a second heat exchanger, wherein a working fluid is circulated between the first heat exchanger and the thermal management components (e.g., heated tubes) of the fluid chamber system.

However, the system can include or be used in conjunction with any other suitable thermal management system, such as an external thermal management system, or can otherwise exclude a thermal management system.

The system can include or be used with an internal support structure 130, which can function to structurally support the chamber housing (e.g., outer wall, with a pressure differential between the chamber interior and an ambient exterior). Additionally or alternatively, in some variants, the internal support structure can function to retain the capture medium within the interior of the chamber housing and/or can function to dampen vibrations (e.g., mitigate vibration propagation through the capture medium, mitigate the vibration influence of external perturbations, etc.). Additionally or alternatively, in some variants, the internal support structure can function to direct fluid flow through the chamber housing (e.g., between an inlet and an outlet, in one or more operating modes, etc.). Additionally or alternatively, in some variants, the internal support structure can function to decrease a thermal resistance between thermal management components of the thermal management system and the capture medium.

Figure 9:
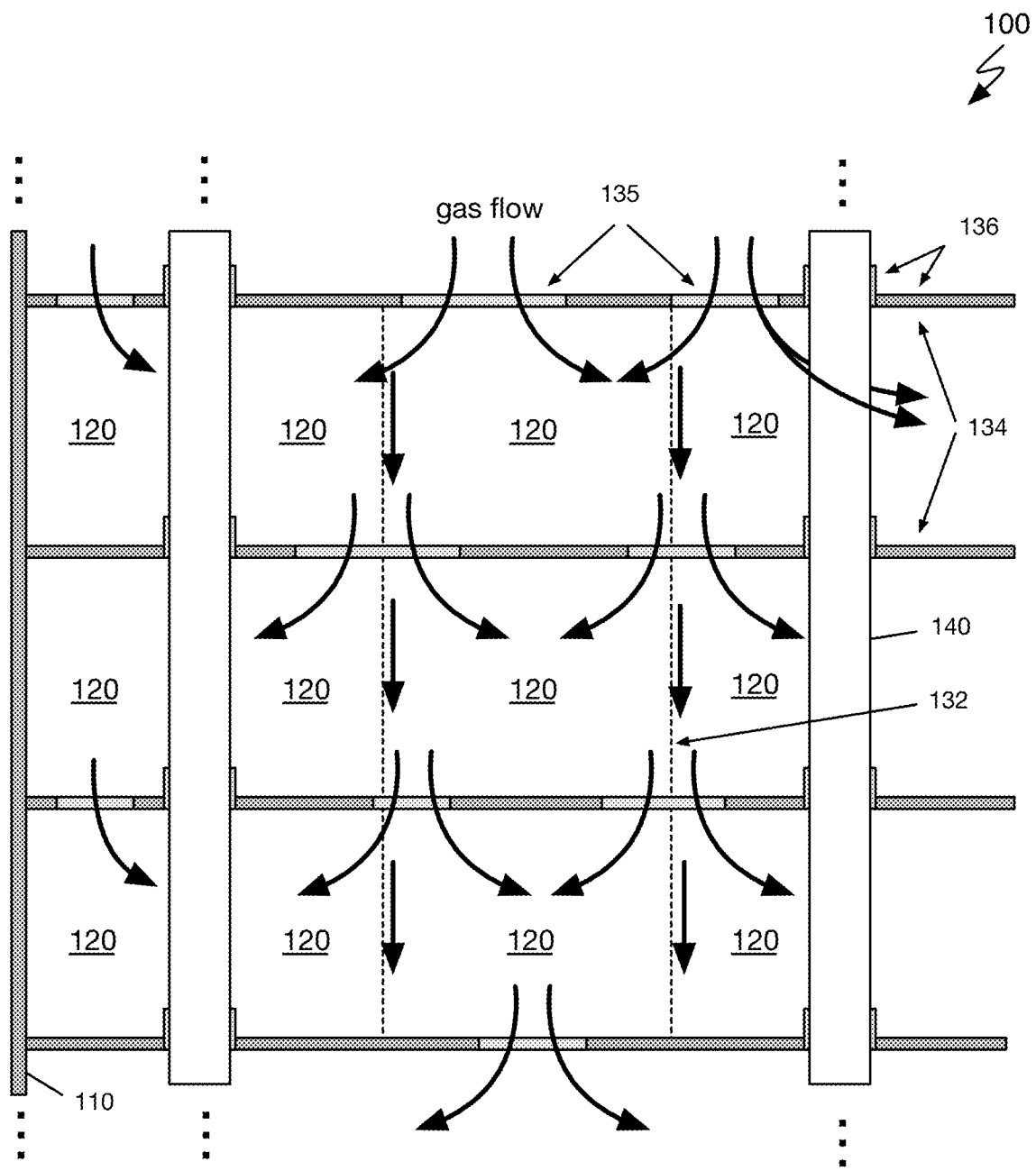
FIG. 9 is a diagrammatic example illustrating gas flow within the chamber interior for a variant of the fluid chamber system.

Internal support structures can be perforated to facilitate gas flow through the interior of the chamber (e.g., an example is shown in FIG. 9). In variants, the internal support structure can include a set of mesh elements, internal baffles, and/or any other suitable components. Internal support structures are preferably perforated but can alternatively be unperforated and/or can have any other suitable construction. Components of the internal support structure can be oriented axially (e.g., along a primary axis of the chamber housing and/or defining a thickness in a radial direction about the primary axis; increasing axial stiffness, providing radial retention of the capture medium, facilitating axial heat flow, etc.), radially (e.g., arranged substantially perpendicular to a primary axis of the chamber housing and/or defining a thickness parallel to the primary axis; increasing radial stiffness, reacting hoop stress of a cylindrical outer wall, providing axial retention of the capture medium, facilitating radial heat flow, etc.), circumferentially (e.g., arranged substantially about a primary axis of the chamber housing), and/or in any other suitable orientations.

Figure 5A:
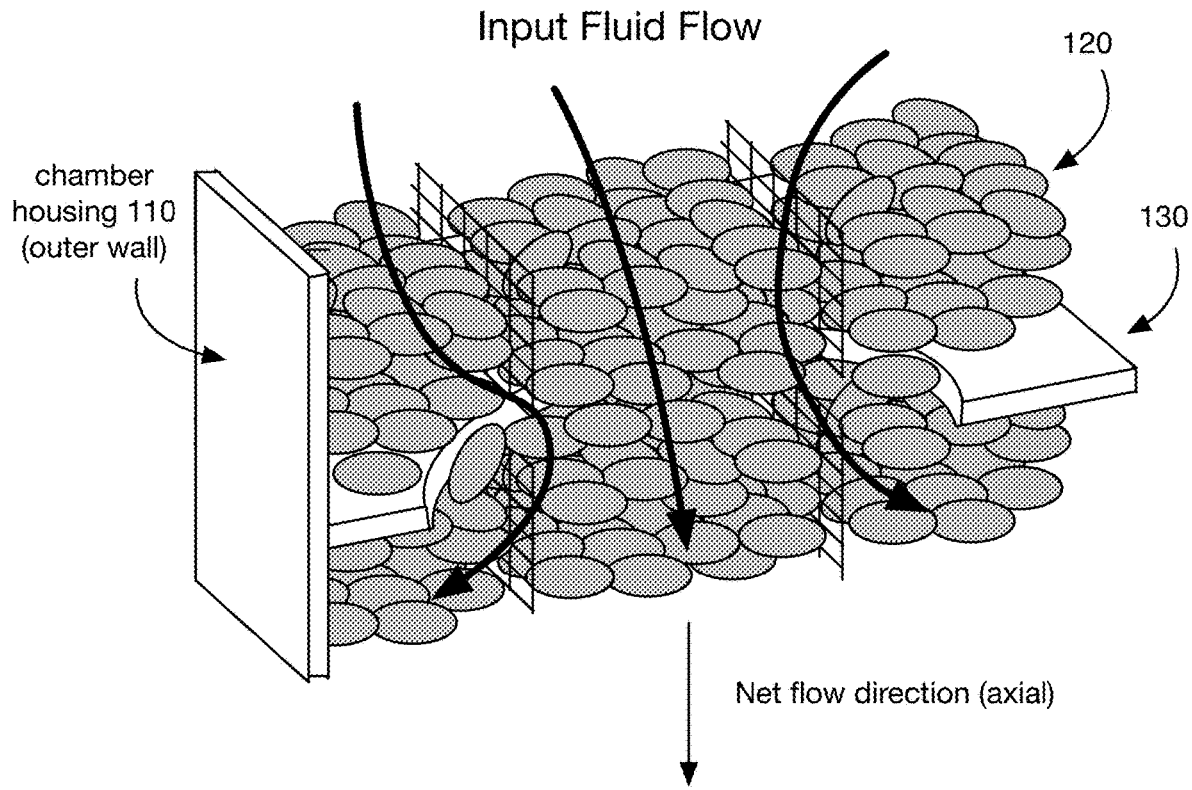
FIG. 5A is a partial 3D representation of a variant of the fluid chamber system, illustrating an example of fluid flow through a capture medium and an internal support structure.
Figure 5B:
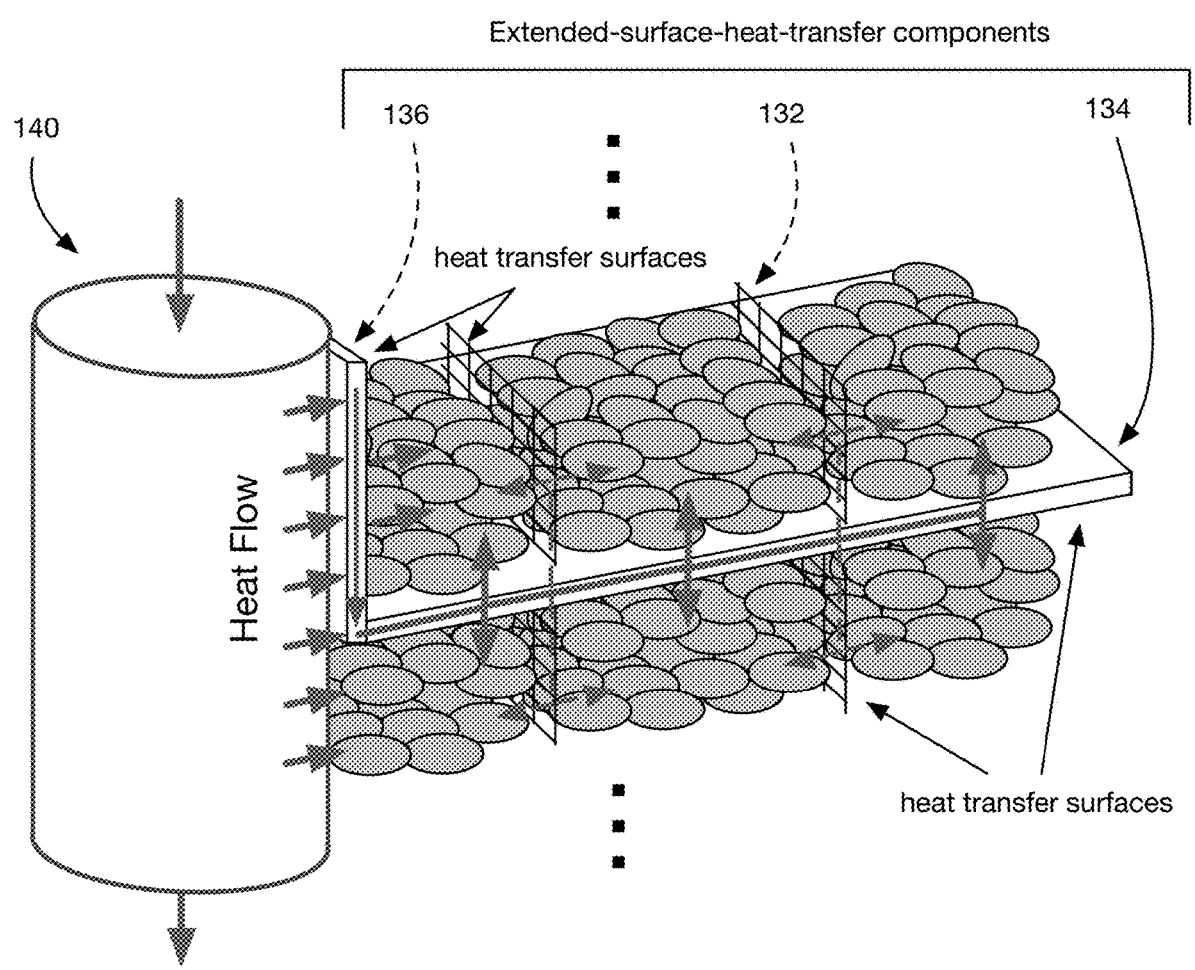
FIG. 5B is a partial 3D representation of a variant of the fluid chamber system, illustrating an example of heat flow through an internal support structure.
Figure 5C:
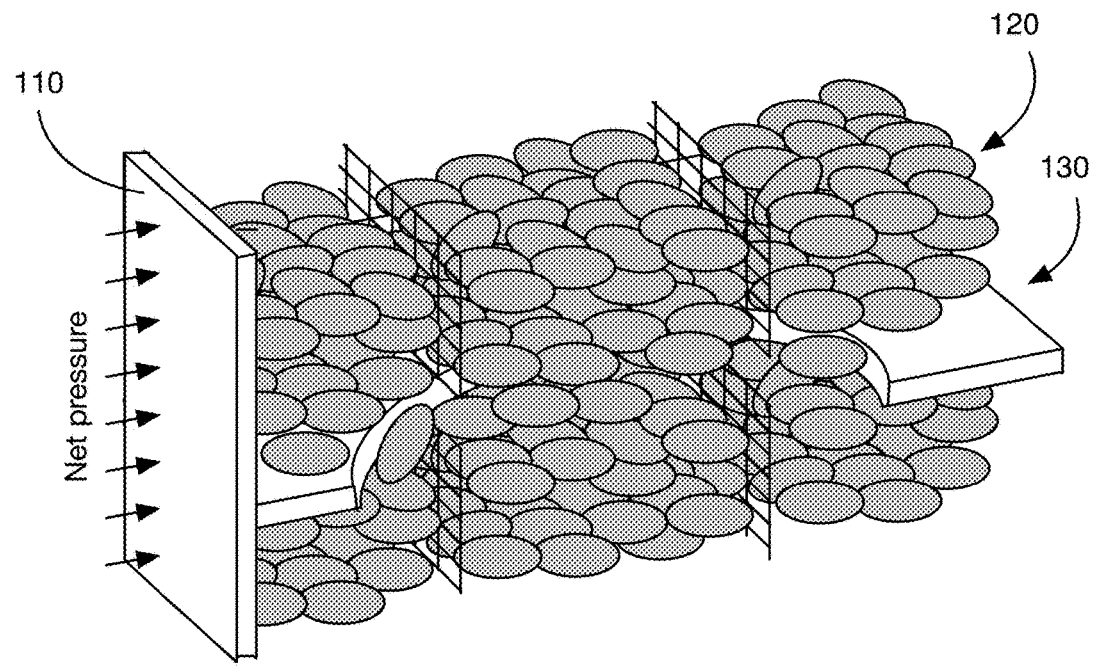
FIG. 5C is a partial 3D representation of a variant of the fluid chamber system, illustrating a net pressure differential across an outer wall of the chamber housing.
Figure 5D:
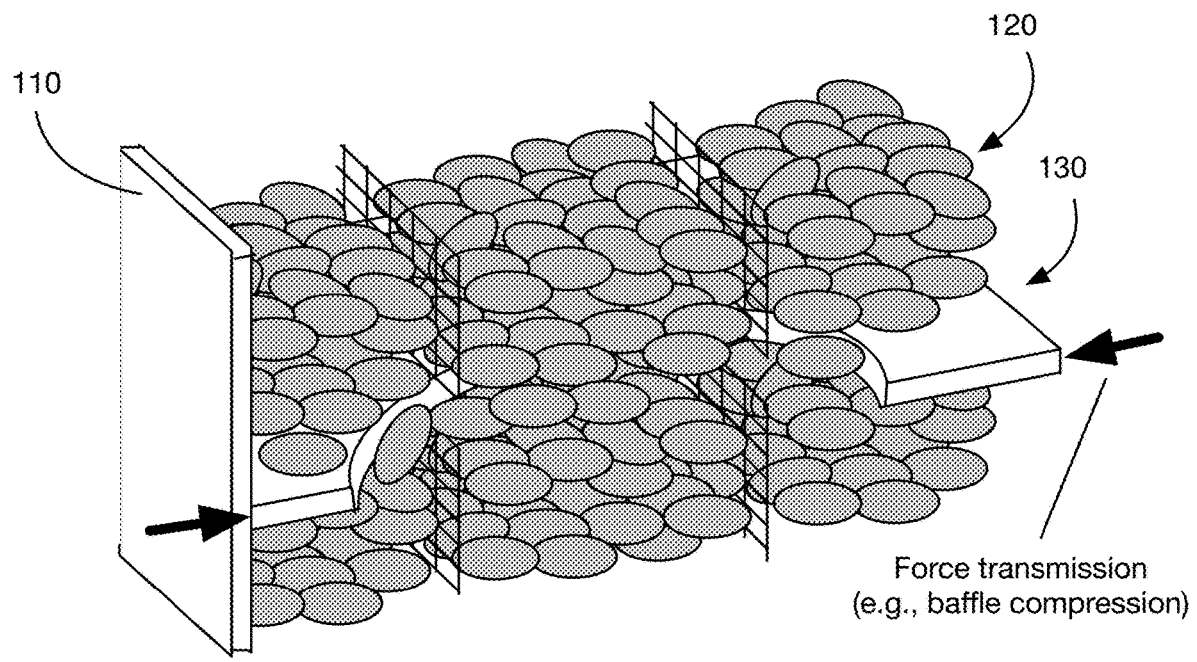
FIG. 5D is a partial 3D representation of a variant of the fluid chamber system, illustrating force transmission through the internal support structure in the example shown in FIG. 5C.
Figure 14:
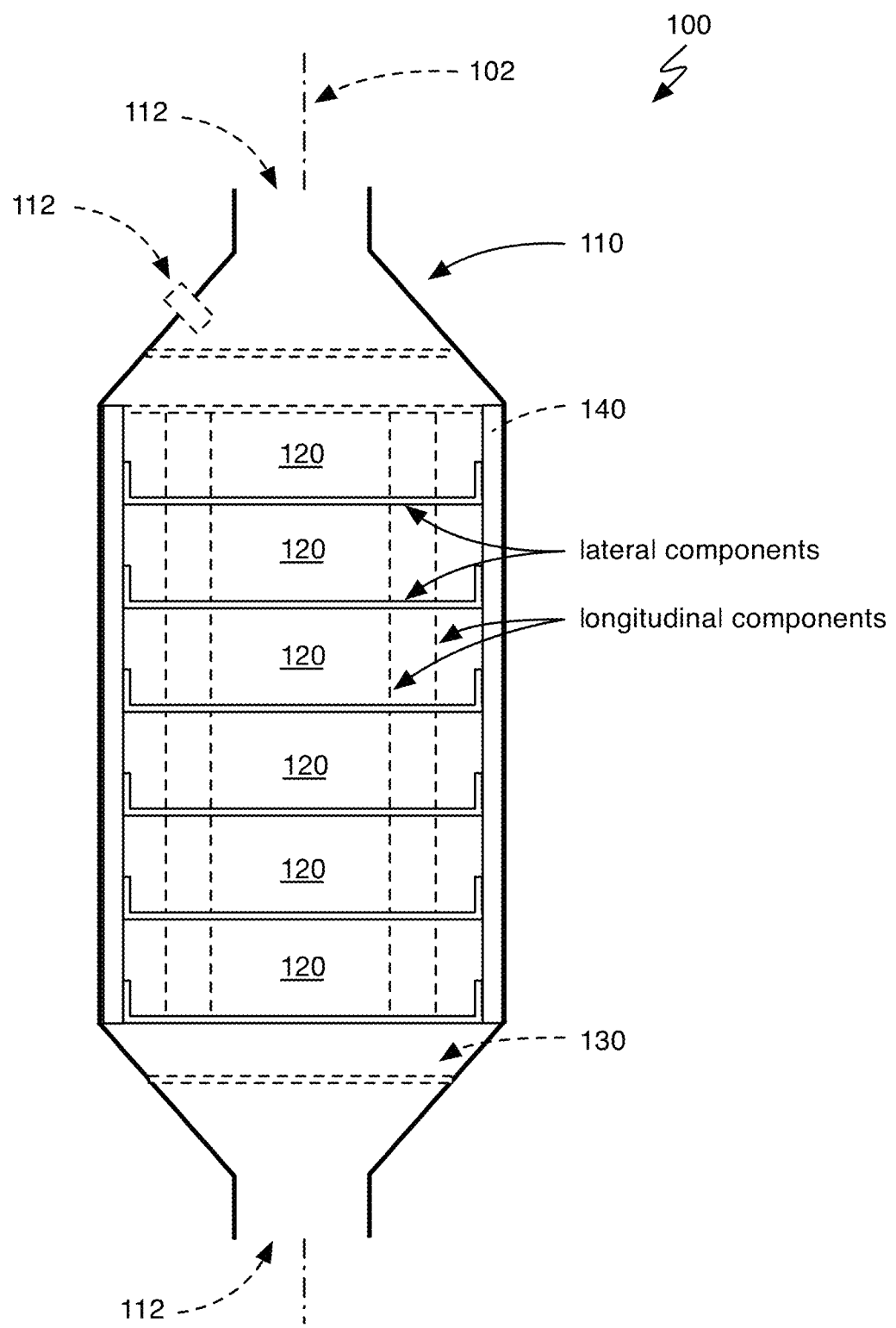
FIG. 14 is a cross-sectional schematic representation of a variant of the fluid chamber system.

In variants, an example of which is shown in FIG. 14, the internal support structure can include a first set of longitudinal components (e.g., which extend along a primary/ longitudinal axis of the chamber) and a second set of lateral components (e.g., which extend orthogonal to the primary axis). For example, lateral components (e.g., perforated discs/baffles) of the internal support structure can span a chamber housing interior along a respective cross section and structurally stiffen the chamber housing across the respective cross section. In an example, the baffles are configured to structurally support the chamber housing under a normal stress arising from a negative pressure differential (e.g., corresponding to an applied vacuum condition within the interior, such as a rough vacuum, partial vacuum, and/or any other suitable vacuum condition; an example is shown in FIG. 5C and FIG. 5D) between the interior and an ambient exterior in the desorption configuration. In a second example, the set of longitudinal components and the set of lateral components are configured to cooperatively dampen perturbations (e.g., axial and/or radial perturbations) of the solid microporous capture medium. Additionally or alternatively, lateral components can facilitate lateral heat flow throughout the interior of the chamber and/or can operate as extended-surface-heat-transfer components, and longitudinal components can facilitate longitudinal heat flow throughout the interior of the chamber and/or operate as extended-surface-heat-transfer components (e.g., as shown in FIG. 5B). Additionally or alternatively, the internal support structure elements can be skewed, angled, or otherwise arranged relative to the longitudinal axis (e.g., not laterally/longitudinally aligned).

Figure 13A:
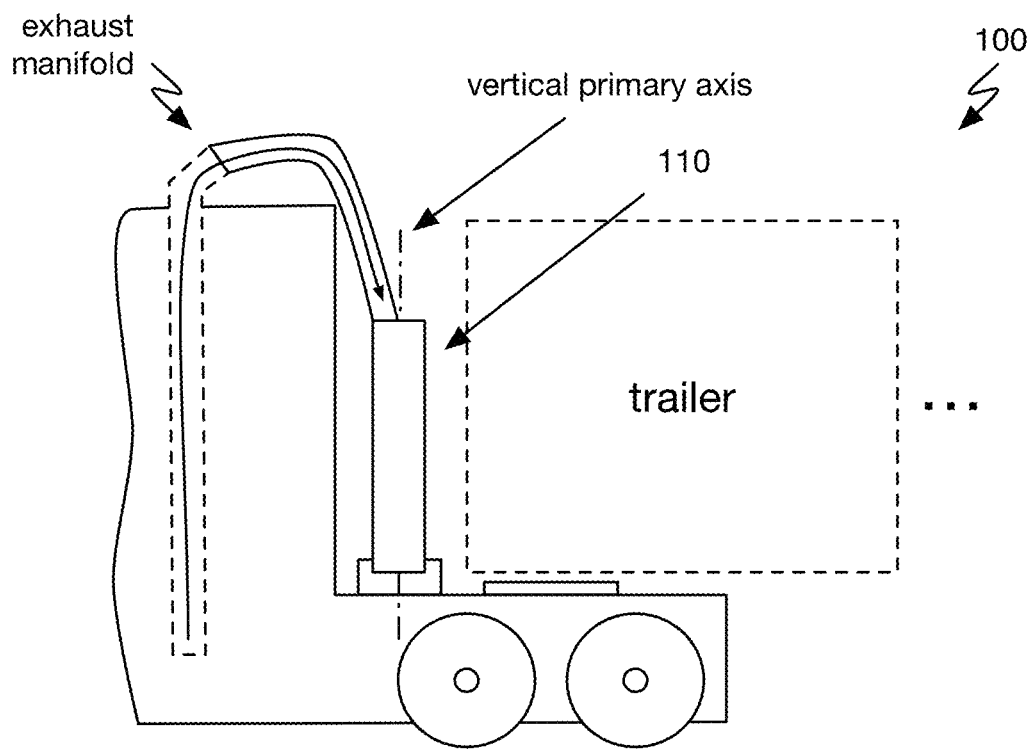
FIGS. 13A-13B are a first and second diagrammatic example, respectively, of a variant of the chamber housing in a vehicle-mounted configuration.
Figure 13B:
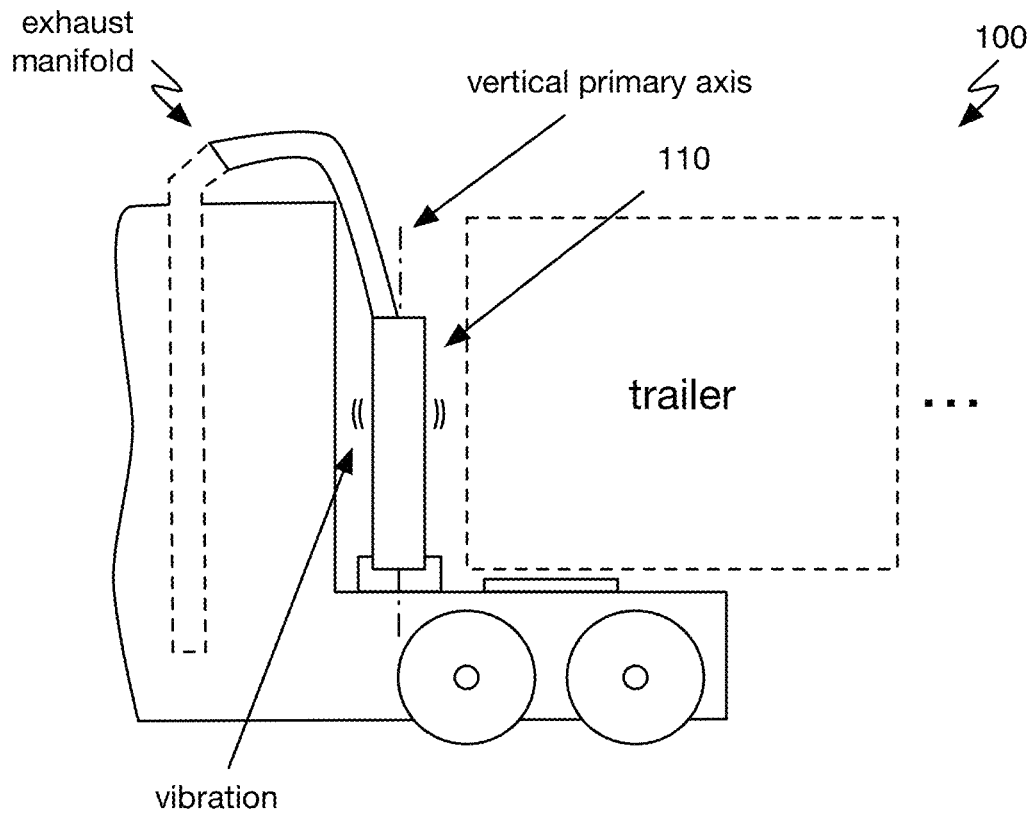

In variants, the chamber housing can be configured to mount to the vehicle with the primary axis substantially vertical relative to a gravity vector (e.g., examples are shown in FIG. 13A and FIG. 13B), wherein a respective portion of the solid microporous capture medium arranged between each adjacent pair of lateral internal support components (e.g., baffles) is structurally supported by the lower component of the adjacent pair. In an example, each baffle spans the interior of the chamber housing and laterally stiffens the chamber housing, while structurally supporting the weight of the capture medium immediately above it.

The components of the internal support structure preferably include (e.g., are made of) metal, such as copper (e.g., elemental or alloyed), steel, and/or aluminum, but can additionally or alternatively have any other suitable material composition, such as composites, thermal interface materials (TIM), polymers, elastomers, rubbers, and/or any other suitable material(s). More preferably, the internal support structure includes weldable materials (e.g., 3000 series aluminum, 5000 series aluminum, low carbon steels, stainless steel, etc.), but can additionally or alternatively include materials having any other suitable characteristics. The internal support structure is preferably constructed from materials with high thermal conductivity (e.g., greater than 10 W/mK; greater than 100 W/mK; greater than 200 W/mK; etc.), such as aluminum, copper, and/or other suitable materials, but can additionally or alternatively include materials having any other suitable thermal properties. In variants, a thermal conductivity of the internal support structure is greater than a thermal conductivity of the capture medium, however the internal support structure can have any suitable absolute or relative thermal conductivity.

Components of the internal support structure are preferably welded (e.g., spot welded, etc.) to the interior of the chamber housing (e.g., interior of an outer wall) and/or thermal management components within the chamber housing, but can additionally or alternatively be brazed, bonded (e.g., using epoxy, etc.), retained by mechanical fasteners (e.g., bolted), retained by a mechanical pre-load (e.g., elastic deformation of a material, such as a torsional pre-load of a spiral structure, torsion spring, band clamp, etc.), and/or otherwise affixed or retained within the interior of the chamber (e.g., floating, constrained by the chamber housing wall and/or capture medium, etc.). In variants, the internal support structure can be axially and/or radially clamped within the housing relative to the primary axis. For example, the internal support structure (e.g., baffle discs) can be radially clamped/preloaded via band clamps, bolted to the housing, and/or axially retained/compressed (e.g., relative to the primary axis) along with the mesh structure and/or axial hardware, rigidly mounted to and/or retained by thermal management components (e.g., axially, radially, etc.), and/or otherwise integrated into the structure of the fluid chamber system. However, the internal support structure can additionally or alternatively be otherwise formed, or can be otherwise integrated into the interior of the chamber housing.

3.1 Internal Support Structure Variant(s)-Mesh.

The internal support structure can include a mesh 132, which can function to retain the capture medium (e.g., a packed bed of solid beads/pellets) and/or dampen mechanical forces (e.g., vibrations) within the capture medium. Additionally or alternatively, the mesh 132 can function to facilitate fluid flow through the capture medium (e.g., a packed bed). In some variants, the mesh can function to retain the capture medium at and/or near the fluid ports (e.g., prevent egress of the capture medium via the ports).

As a first example, mesh can be arranged crosswise (e.g., orthogonal to the primary axis, across an end of the chamber, covering an orifice in a baffle, etc.; as a radial element of the internal support structure) at one or more ends of the chamber (e.g., spanning an inlet and/or outlet port). Additionally, mesh can be oriented axially (e.g., extending along a portion of the axial length of the chamber (e.g., relative to the primary axis), which can provide radial retention and/or damping between portions of the capture medium.

The mesh size (e.g., individual grid/mesh cell size, hole size, etc.) is preferably smaller than a minimum cross section of the capture medium elements (e.g., beads or pellets), such as defining at least one dimension which is between 20% and 80% the size of a minimum dimension of the capture media (e.g., thereby preventing capture medium elements from moving through the mesh). However, the mesh size can alternatively be larger than a subset of the capture medium elements (e.g., such as for a non-homogeneous capture media), can be larger than all (or substantially all) of the capture medium elements, and/or can be otherwise suitably sized. The mesh can be a grid mesh (e.g., with rectangular or square cells), a triangular mesh, hexagonal mesh, 2D mesh (e.g., such as might be stored in a roll, with wire elements extending in two directions and tangentially overlapping to form a substantially 2D structure), 3D mesh (e.g., hexagonal lattice, tetrahedral, etc.), chaotic mesh structure, and/or any other suitable mesh structure. The mesh size can be uniform or non-uniform (e.g., mesh/cell size can vary in different parts of the fluid chamber system). In a specific example, the mesh can be a number 8 size mesh (e.g., 2.38 mm mesh size), however the mesh can have a mesh number (e.g., holes or cells per inch) of: 1, 3, 5, 7, 9, 12, 18, larger than 18, within any suitable open or closed interval bounded by one or more of the aforementioned values, can be larger than a size 1 mesh, and/or can have any other suitable dimension (e.g., based on the size of the capture media elements). Alternatively, the mesh can include any other suitable hole patterns, hole geometries, perforations or other geometric structure/shape. Additionally or alternatively, the mesh structures can include modular mesh structures, such as balls (e.g., circumferentially enclosing capture media and/or not enclosing capture media and defining a void within the interior, etc.), spheres, cones, or shaped to resemble another 3D solid (e.g., tetrahedron), which can be arranged within the interior (e.g., rigidly mounted, loosely arranged/retained, compressed between baffles, etc.), and/or the mesh can form any other suitable structure(s). In a specific example, wherein mesh holes/apertures are smaller than a characteristic length of the capture medium, the mesh structure can separate, in a radial direction relative to the primary axis, a first portion of the solid microporous capture medium from a second portion of the microporous capture medium, wherein the mesh structure dampens vibrations between the first and second portions of the microporous capture medium.

Figure 6A:
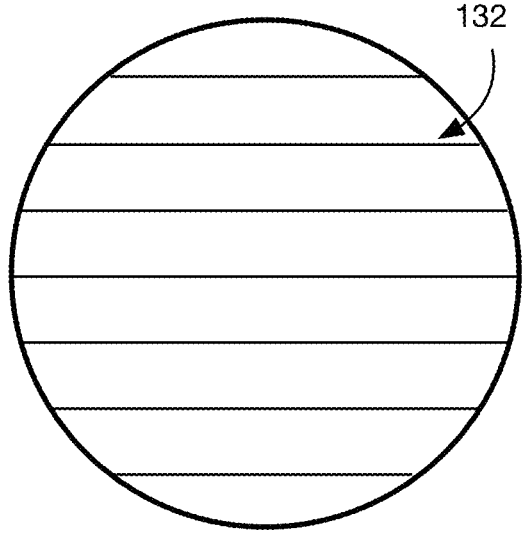
FIGS. 6A-6D are a first, second, third, and fourth cross-sectional diagrammatic example, respectively, of an internal support mesh in one or more variants of the fluid chamber system, respectively.
Figure 6B:
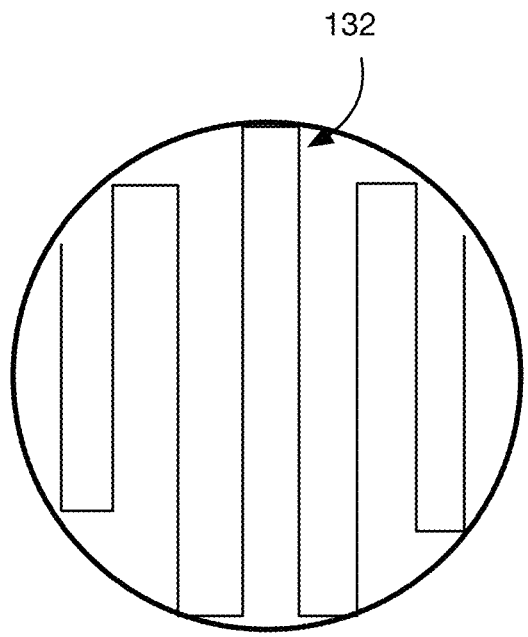
Figure 6C:
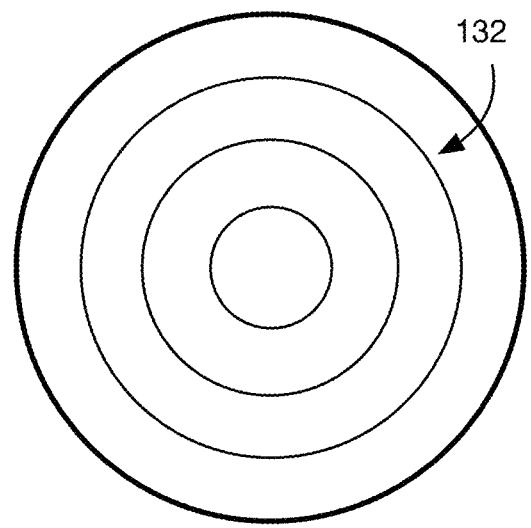
Figure 6D:
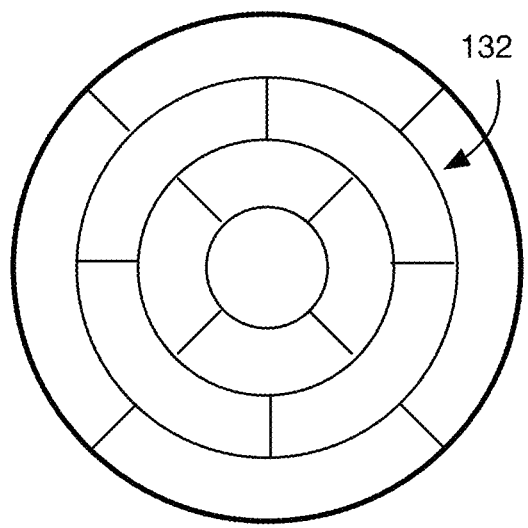
Figure 7A:
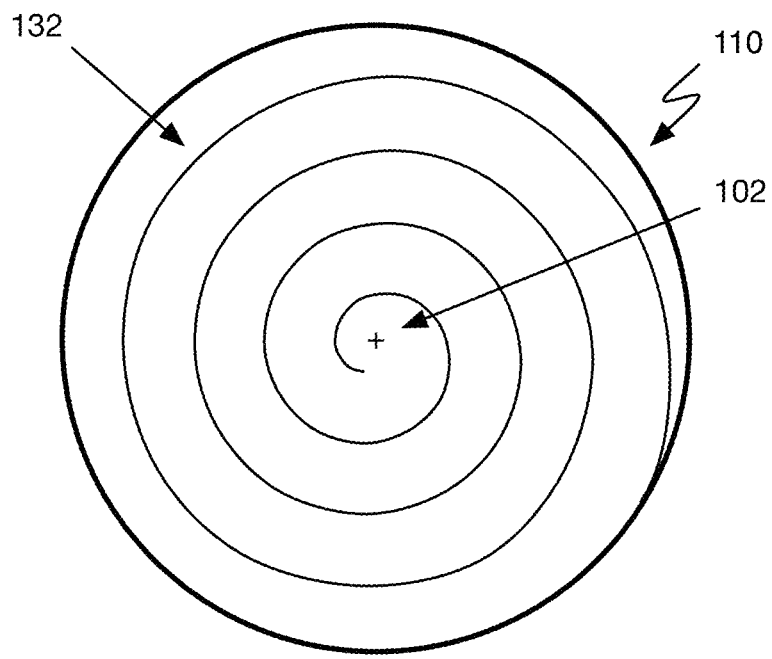
FIG. 7A is a cross-sectional diagrammatic example of an internal support mesh in a variant of the fluid chamber system.
Figure 7B:
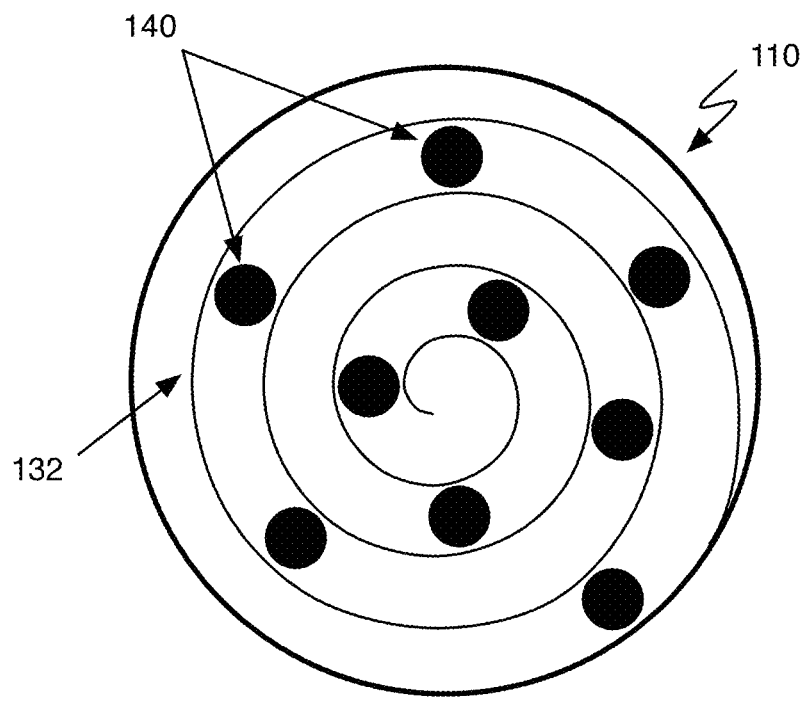
FIG. 7B is a cross-sectional diagrammatic example of an arrangement of thermal management components in a variant of the fluid chamber system.

The mesh internal structure can be a single (unitary) body or can include a plurality of discrete components (e.g., elements terminating at a radially-oriented internal support structure, such as a baffle disc; arranged at separate sections along the axial length of the chamber housing; including and axially-oriented mesh body which is decoupled from a radially-oriented elements; etc.). In variants, the mesh can include one or more elements defining a substantially uniform cross section(s) along the primary axis (e.g., for cross-sections on planes orthogonal to the primary axis), or can have a varying or non-uniform cross section along the primary axis (e.g., internal tetrahedral 3D structure, etc.). In some variants, some mesh structures with uniform cross-sectional geometries may simplify manufacturing (e.g., since they may be conveniently formed with one or more mesh rolls and/or assembly (e.g., since they facilitate access through axial ends of the vessel). The mesh can have a spiral shape (e.g., an example is shown in FIG. 2A, FIG. 3A, FIG. 7A, and FIG. 7B), parallel planar geometry (e.g., an example is shown in FIG. 6A), boustrophedonic cross-sectional geometry (e.g., an example is shown in FIG. 6B), concentric rings and/or circular cross sections (e.g., an example is shown in FIG. 6C, a second example is shown in FIG. 6D), and/or any other suitable geometry(ies). In a specific example, the mesh structure defines a spiral about the primary axis. However, the mesh can include any other suitable structural elements and/or geometry.

The mesh 132 preferably includes (e.g., is constructed from) one or more metals (e.g., aluminum or steel alloys; copper, etc.) and/or other elastic materials (e.g., with lower modulus of elasticity than the capture medium), which can elastically deform under vibrations (e.g., roadway vibrations, 10-120 Hz; etc.) to dampen motion of the solid capture medium. As an example, vibration of packed solids (e.g., Zeolite) may have an abrasive effect (e.g., which may be analogous to vibratory finishing to remove metal burrs in various manufacturing processes), which may undesirably degrade brittle porous solids (e.g., causing fracture, grinding, and/or pulverization of the solids). Accordingly, mesh in contact with the capture medium can reduce propagation of vibrations and/or perturbations (e.g., such as might result from roadway motions, bumps, vehicle suspension characteristics, etc.) through the capture medium to minimize internal abrasion. In a specific example, the mesh internal structure is formed from a metal mesh, such as an aluminum mesh. Additionally or alternatively, the mesh internal structure can have a thermal conductivity which is greater than a thermal conductivity of the capture medium.

Figure 2A:
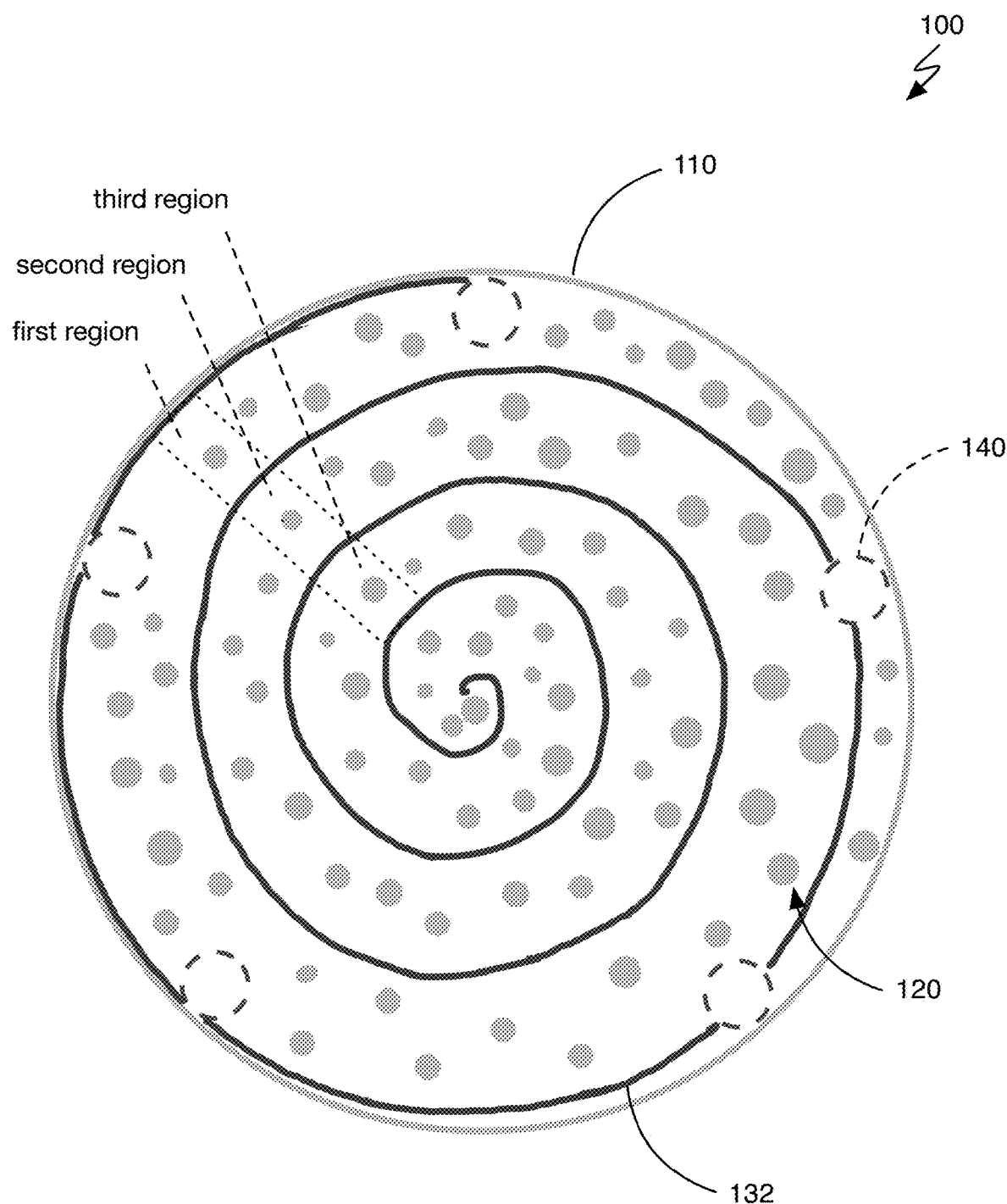
FIG. 2A is a cross-sectional representation of a variant of the fluid chamber system, which shows an example of a mesh internal support structure.

The mesh is preferably arranged to offset and/or separate regions of the capture medium (e.g., separate regions of a radial cross-section; evaluated between a primary axis and an outer wall of the chamber housing; an example is shown in FIG. 2A, which depicts a cross-section orthogonal to the primary axis), restricting motion of the capture medium and/or vibration propagation through the capture medium therebetween. In some examples (e.g., such as in the example in FIG. 2A), the vibration and/or fluid flow benefits of this separation can be imparted with a circuitous coupling or connection between the regions (e.g., such as by a circumferential arc or spiral between radial regions of a spiral). In other words, distinct regions may be partially separated (e.g., radially separated, but circumferentially or spirally connected; radially connected, but separated along a circumferential or spiral arc) from one another while achieving a desired vibration and/or fluidic effect. In some cases, the capture medium existing within a unitary volume (e.g., topologically continuous; where the regions are circuitously connected, where mesh cells are treated as a closed boundary; enabling capture medium flow and/or redistribution throughout an entirety of the unitary volume; etc.) may be advantageous for system assembly, since the capture medium may be inserted/filled from a single position (e.g., may be redistributed during assembly to entirely fill the available space, etc.). Alternatively, regions can be volumetrically isolated from one another (e.g., completely preventing an element of the capture medium from transitioning between regions, such as where the mesh cross sections illustrated in the examples shown in FIG. 6C and FIG. 6D are uniform along the central axis).

In variants, the mesh structure separates, in a radial direction relative to the primary axis, a first portion of the solid microporous capture medium from a second portion of the microporous capture medium, wherein the mesh structure is configured to dampen vibrations between the first and second portions of the microporous capture medium.

Figure 4:
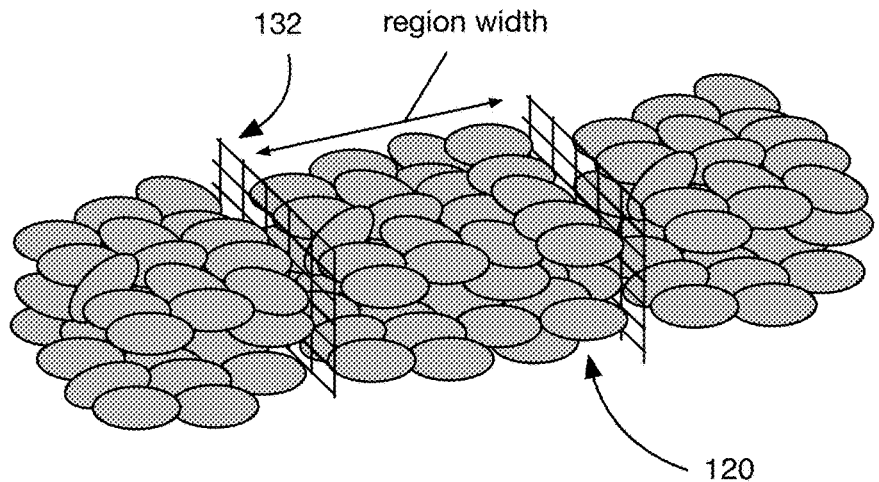
FIG. 4 is a partial 3D representation of an example mesh internal support structure for one or more variants of the fluid chamber system.

The width of the regions (e.g., radial distance between mesh; minimum width within a particular cross section; an example is shown in FIG. 4; etc.) is preferably about 3 to 6 times the characteristic length of the capture medium elements, but can be proportional to the characteristic length of the capture medium elements by: less than 200%, 200%, 300%, 600%, 800%, 1000%, 1200%, greater 1200%, within any suitable open or closed interval bounded by one or more of the aforementioned values, and/or any other suitable size.

As an example, the mesh can reduce the packing density of the capture medium within the volume of the interior (e.g., relative to the random packing density of the capture medium, such as a random packing density defined by and/or otherwise associated with the media element geometry). The net packing density of the capture medium is preferably less than the packing density of randomly packed cylinders (e.g., of equivalent aspect ratio), spheres, and/or ovaloids (e.g., of similar aspect ratio). For instance, the net packing density of the capture medium can be: less than 50%, 50%, 55%, 60%, 62%, 64%, 66%, greater than 66%, within any suitable open or closed interval bounded by one or more of the aforementioned values; the ratio of the net packing density to a meshless packing density can be: less than 0.65, 0.65, 0.75, 0.8, 0.85, 0.9, 0.95, 0.98, 0.99, 1, within any suitable open or closed interval bounded by one or more of the aforementioned values; and/or any other suitable packing density. As an example, the net packing density of the capture medium decreases for smaller mesh sizes and/or smaller region widths. Accordingly, the lower packing density and/or bed boundary constraints imposed by the mesh can increase fluid permeability and/or reduce the pressure losses along the axial length of the chamber (e.g., reducing pressure loss between the inlet and outlet ports;

which can prevent exhaust backflow for an engine fluidly coupled to the inlet port). Additionally or alternatively, the mesh can facilitate an axial net fluid flow through the chamber interior (e.g., from the inlet to the outlet). However, the mesh can otherwise suitably enable fluid flow within the interior of the chamber housing.

In variants, the mesh can separate a first portion of a solid microporous capture medium from a second portion of the microporous capture medium. In such variants, the mesh can be configured to dampen vibrations between the first and second portions of the microporous capture medium. Additionally or alternatively, the mesh structure can reduce a packing density of the solid microporous capture medium adjacent to a mesh boundary between the first and second portions of solid microporous capture medium, thereby reducing a fluid flow resistance (e.g., increasing fluid conductance) along the mesh boundary relative to a reference resistance associated with the solid microporous capture medium (e.g., which may reduce the overall pressure drop through the interior; which can facilitate a net pressure drop within an exhaust gas stream which is less than a threshold amount, such as 10 kPA, through the interior of the chamber, between the inlet port and the outlet port).

The mesh can be fixed in place (e.g., such as by mechanical fasteners, bonding, welding, brazing, or otherwise affixing the mesh), with the mesh connected to the interior of the chamber housing, thermal management components within the interior, and/or other internal support structures (e.g., baffles, etc.). Alternatively, one or more elements of the mesh can be movably retained within the interior of the chamber housing such that the mesh can translate and/or rotate relative to the chamber housing (e.g., as a result of vibrations and/or external perturbation). In variants, the mesh can be configured to provide axial structural support and/or axial retention (e.g., of the capture medium), but can additionally or alternatively be non-load bearing (e.g., relative to chamber housing loads; where the outer wall of the chamber housing is capable of fully supporting axial loads; etc.). In some examples, the mesh may be held substantially in place by the presence of the capture medium (e.g., which restricts motion of the mesh relative to the capture medium and/or of the capture medium relative to the mesh). However, the mesh can be otherwise suitably arranged and/or constrained within the interior of the chamber housing.

In a specific example of the fluid chamber in the adsorption configuration, the inlet port is the configured to receive an exhaust gas stream from the vehicle exhaust manifold, wherein the mesh structure reduces a packing density of the solid microporous capture medium proximal a mesh boundary between a first and a second portions of solid microporous capture medium, thereby reducing at least one of axial and radial flow resistance along the mesh boundary relative to a reference resistance associated with random packing of the solid microporous capture medium (e.g., wherein, in the adsorption configuration, a pressure drop within the exhaust gas stream is less than a threshold amount, such as 10 kPA, between the inlet port and the outlet port).

However, the internal structure can include any other suitable mesh and/or mesh structures. Additionally or alternatively, the system may otherwise retain and/or heat the capture medium, and/or be used without mesh.

3.2 Internal Support Structure Variant(s)—Baffles.

Figure 8A:
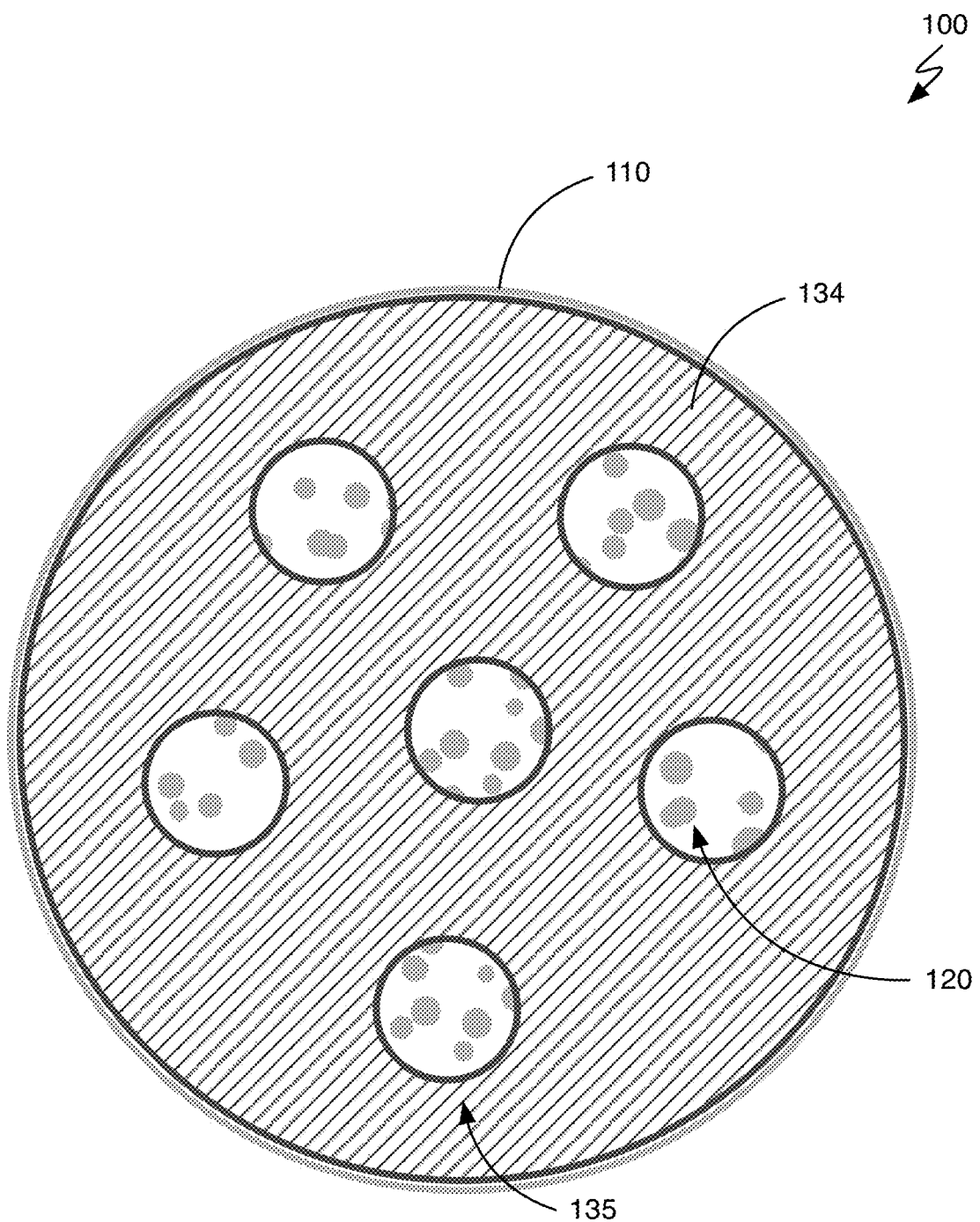
FIGS. 8A-8C are cross-sectional views of a first, second, and third variant of the system, respectively.
Figure 8B:
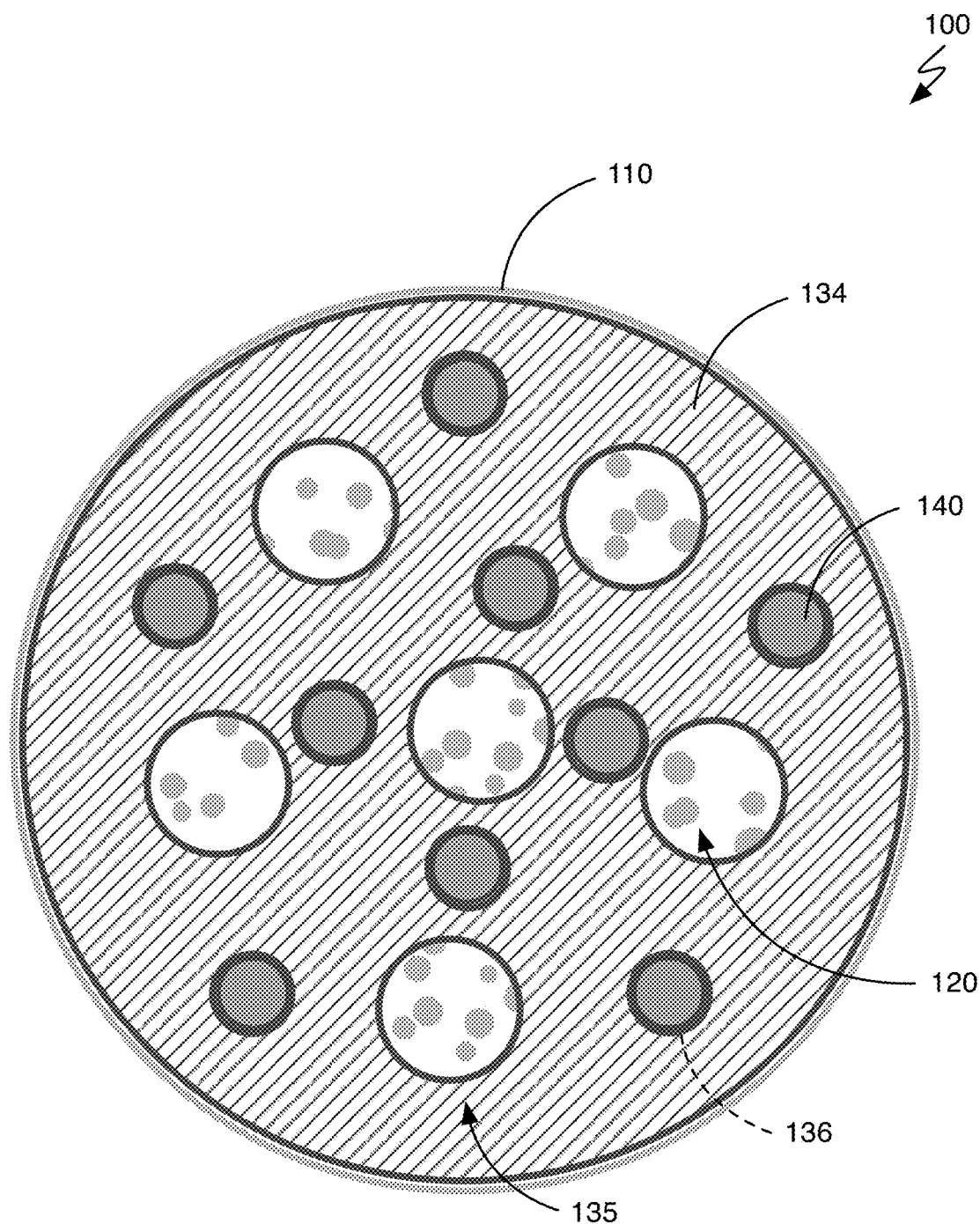
Figure 8C:
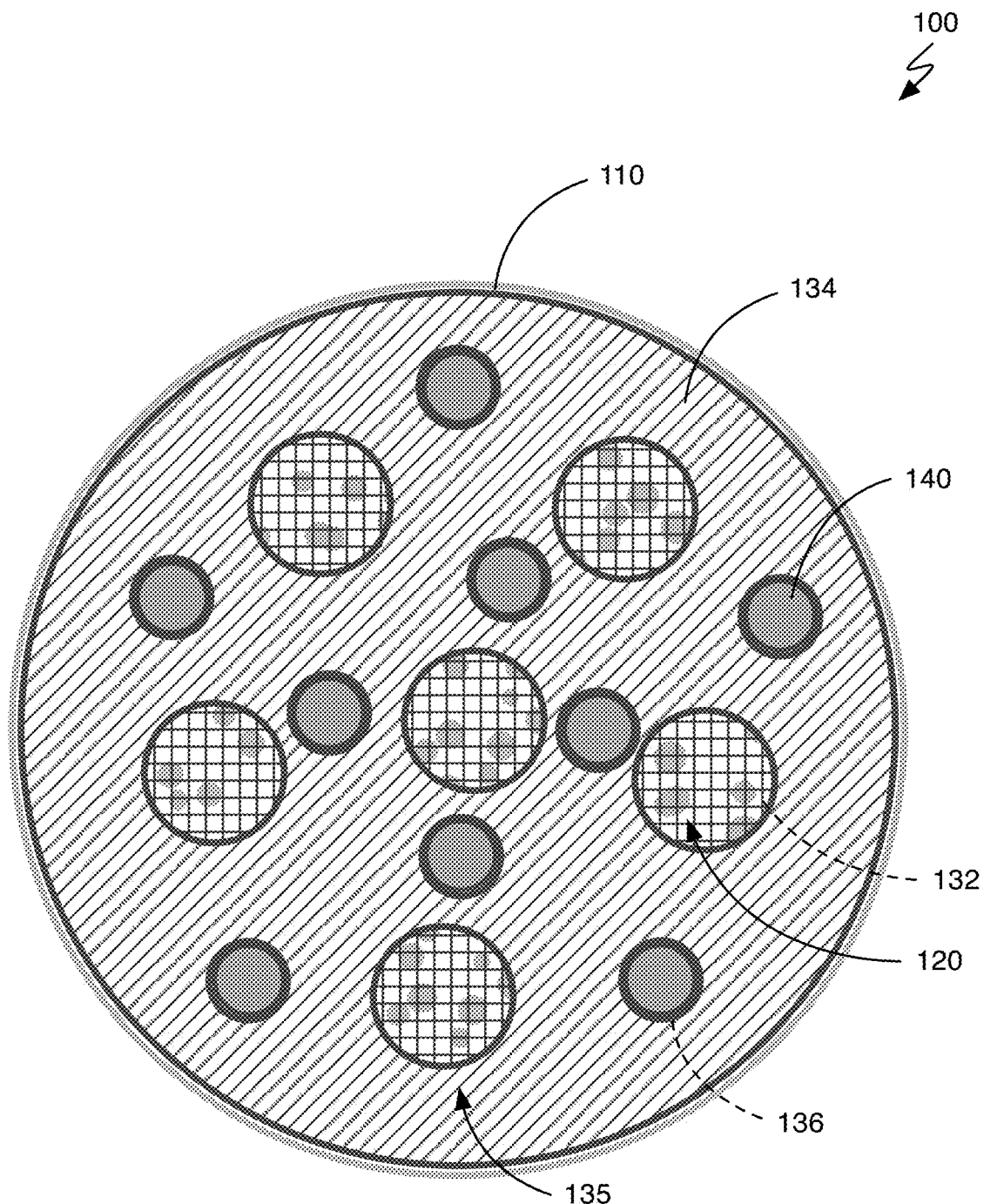

The internal support structure can include a set of one or more baffles 134, examples of which are shown in FIG. 8A, FIG. 8B, and FIG. 8C, which can function to direct fluid flow through the chamber housing (e.g., between an inlet and an outlet, in one or more operating modes, etc.). Additionally or alternatively, the baffles can structurally reinforce the chamber housing within the interior, which can reduce the required thickness of the outer wall (e.g., to satisfy modal and/or pressure constraints). Each baffle preferably spans the chamber housing interior along a respective cross section and structurally stiffens the chamber housing across the respective cross section, but can be otherwise arranged.

The baffles can be spaced at intervals (e.g., uniform, non-uniform) along the length of the chamber housing (e.g., an example is shown in FIG. 1), with capture media (e.g., and/or mesh) preferably interspersed between the baffles. The baffles are preferably arranged substantially perpendicular to primary axis and/or net flow direction of the chamber housing, but can be otherwise arranged. The baffles are preferably flat and/or planar elements (e.g., discs), but can additionally or alternatively be arcuate, concave, tapering, and/or have any other suitable shapes or structures. The baffles can have a thickness of: less than 1 mm, 1 mm, 1.25 mm, 1.5 mm, 2 mm, 2.5 mm, 3 mm, 3.175 mm, greater than 3.175 mm, within any suitable open or closed interval bounded by one or more of the aforementioned values, and/or any other suitable thickness. As an example, the thickness of the baffles can be selected based on a structural mass optimization and/or a thermal mass optimization.

Figure 2B:
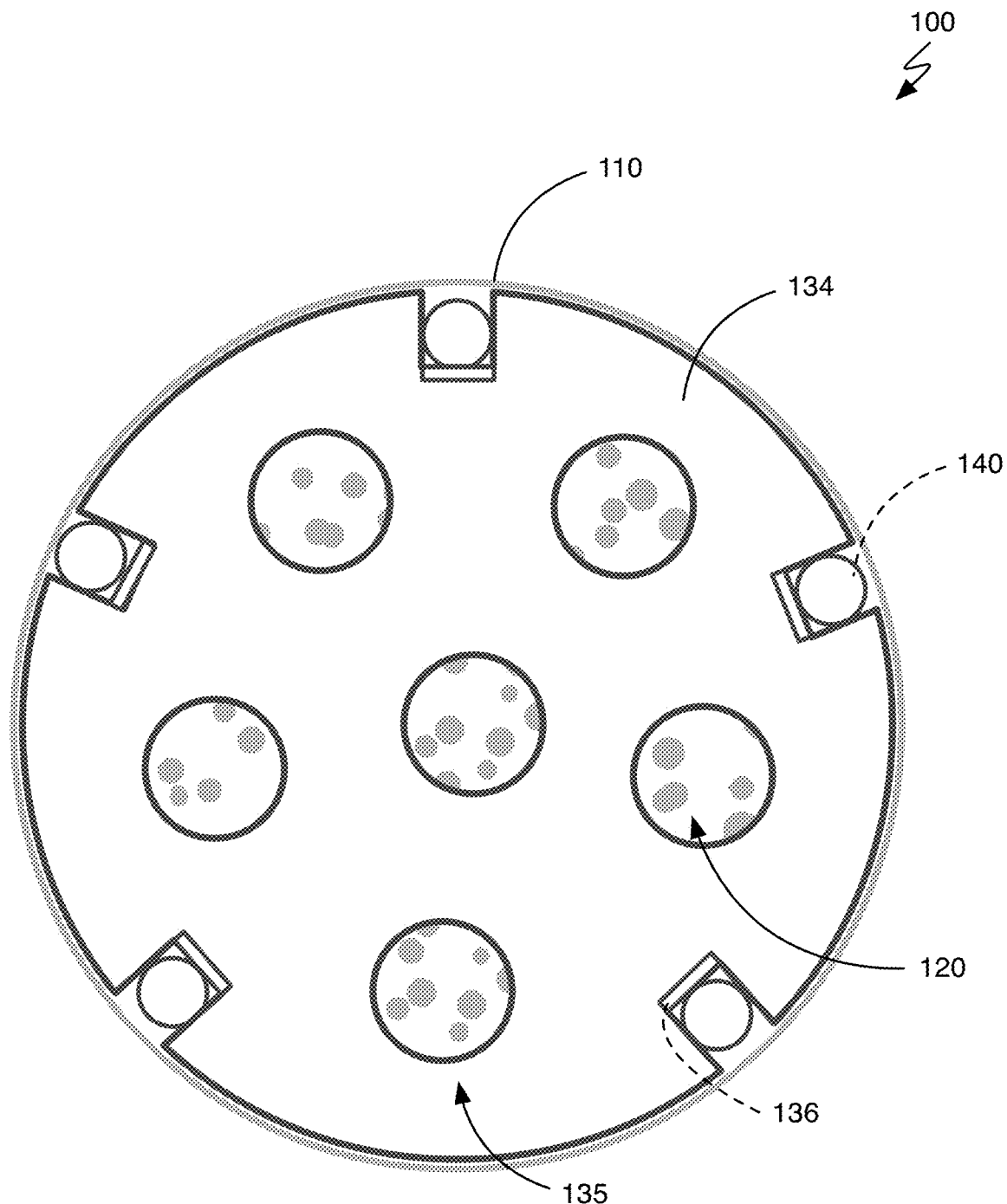
FIG. 2B is a cross-sectional representation of a variant of the fluid chamber system, which illustrates an example of an internal support structure baffle.
Figure 3A:
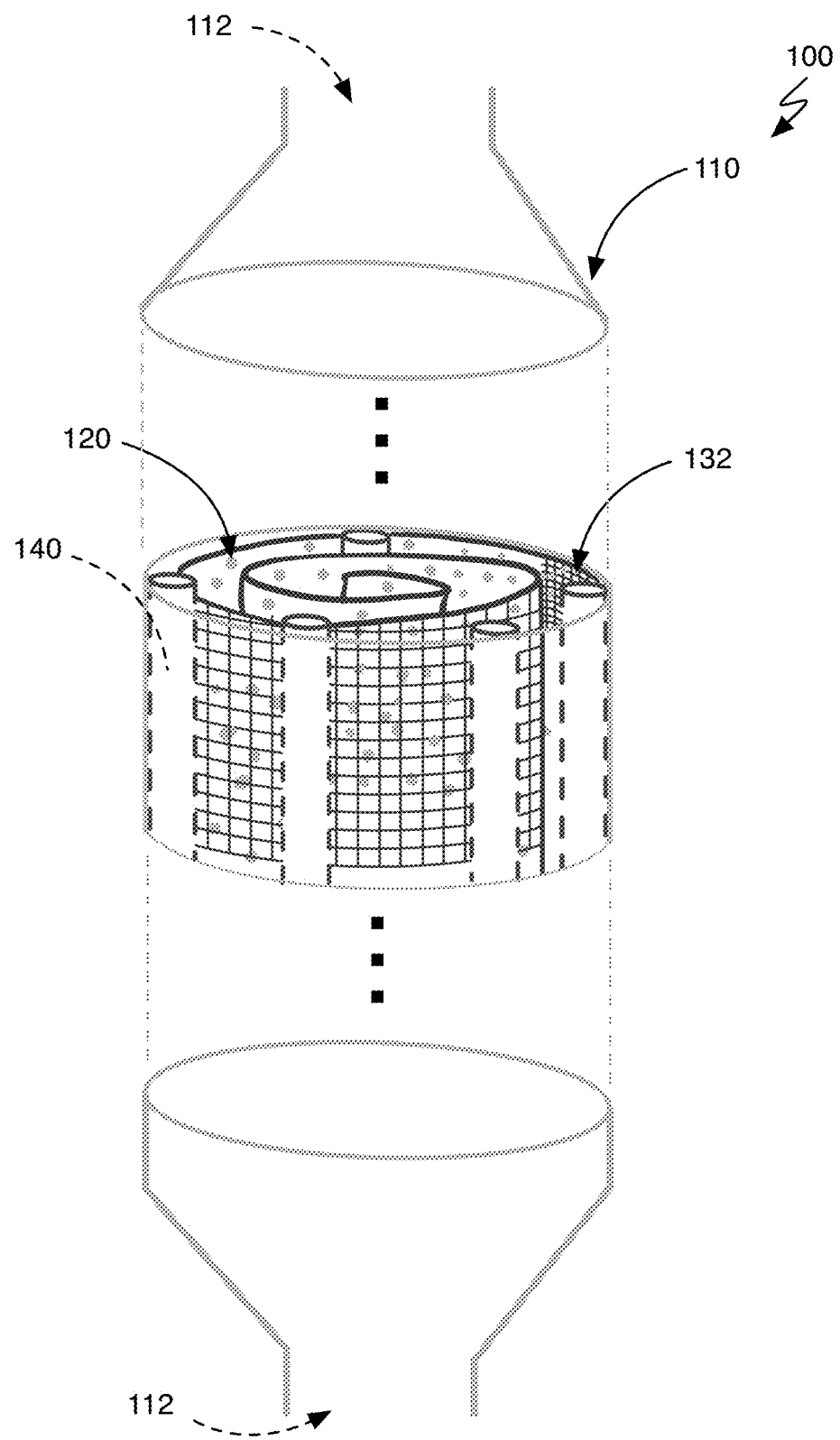
FIG. 3A is a partial isometric cutaway view representation of a variant of the fluid chamber system, which illustrates an example of an internal support structure.
Figure 3B:
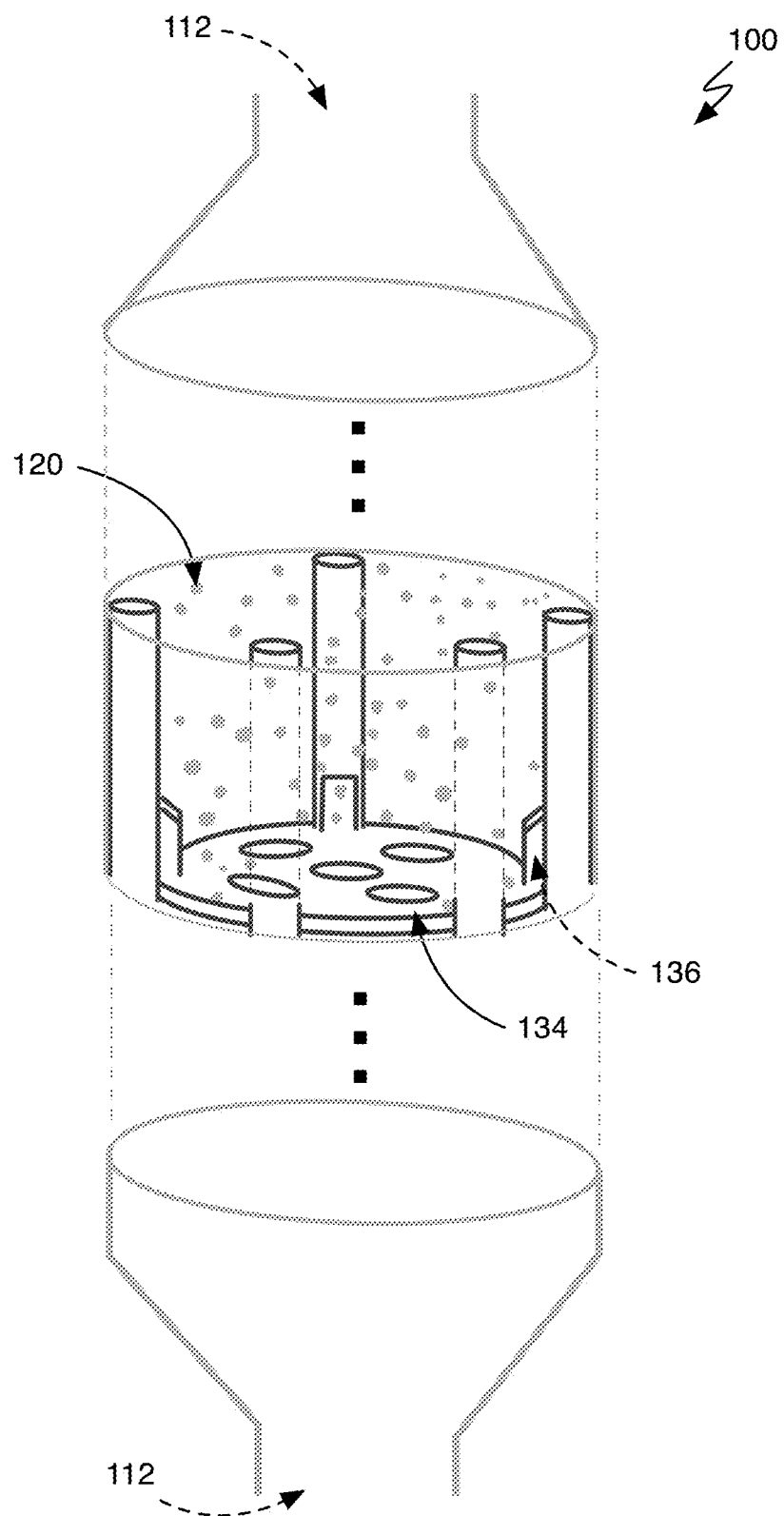
FIG. 3B is a partial isometric cutaway view representation of a variant of the fluid chamber system, which illustrates an example of an internal support structure.

The baffles can be lateral internal support members and/or extend laterally (e.g., orthogonal to the primary axis; with a surface normal and/or net flow direction substantially parallel to the primary axis), but can additionally or alternatively be longitudinal internal support members, and/or can be otherwise configured. Each baffle of the set can include a set of flow apertures 135 (e.g., through-holes; an example is shown in FIG. 2B and FIG. 3B) which extend through the thickness of the baffle (e.g., fluidly connecting opposing sides/faces; axial flow apertures). The flow apertures are preferably larger than the elements of the capture media (e.g., pellets and/or beads may move through the apertures), but can additionally or alternatively be smaller than the elements of the capture media and/or may be used with a mesh screen to inhibit translation of the capture media through the flow apertures (e.g., at opposing ends of the chamber, to avoid egress of capture media through the inlet/outlet ports). The aperture patterns can be similar and/or uniform between different baffles (e.g., uniform or substantially uniform along the primary axis), or can be varied (e.g., such as proximal to the ends of the chamber and/or ports, where the flow is initially concentrated). Apertures can be circular, polygonal, and/or have any other arbitrary shape(s). However, the baffles can additionally or alternatively include any other suitable set of flow apertures with any other suitable geometry(ies).

The baffles and/or flow apertures therein are preferably arranged to distribute the input fluid flow substantially uniformly (e.g., uniformly distributed turbulent flow, uniform pressure loss, etc.) across the capture media. Additionally or alternatively, the baffles can be configured to increase a number of collisions of the input fluid and the capture media (e.g., as compared with flow between the inlet and outlet ports in absence of the baffles). When passing through a capture media bed, the flow paths of the input fluid (e.g., as directed by the baffles) are preferably non-linear and/or circuitous, as they navigate the surfaces and/or spaces between elements of the bed. In variants, including axially-oriented mesh the baffles can direct the fluid flow to cross through the mesh (e.g., an example is shown in FIG. 5A), while maintaining an axial net flow direction. The input fluid flow through the apertures and/or capture medium is preferably turbulent, but can alternatively be laminar (in one or more operational modes of the system).

In variants, flow apertures of the baffles can be aligned and/or unaligned (e.g., wherein unaligned flow apertures have at least partially non-overlapping axial projections, such as defining disjoint sets of projected areas). For example, adjacent pair of baffles may have unaligned flow apertures with at least partially non-overlapping axial projections (e.g., disjoint sets of projected areas). As a second example, baffle apertures can be patterned/repeated, such that each baffle of a plurality of the baffles defines a substantially identical cross-section (e.g., orthogonal to the primary axis) as every other baffle of the plurality (or of any suitable subset thereof).

The baffles can be affixed to the chamber housing (e.g., outer wall of the chamber housing), thermal management components within the interior of the chamber housing, and/or a mesh internal support structure. The baffles can include (e.g., be made of) the same material(s) as the chamber housing and/or the thermal management components, and/or include different material(s). In a specific example, the baffles and the chamber housing can be integrated into a unitary body (e.g., welded).

However, the internal structure can include any other suitable baffles. Additionally or alternatively, the system may otherwise direct fluid flow and/or heat the capture medium, and/or can be used without baffles.

However, the system can include any other suitable components.

3.3 Internal Support Structure Variant(s)—Heat Distribution.

The internal support structure can optionally include or be used with a set of heat transfer surfaces 136 (e.g., extended surfaces), which can function to reduce the net thermal resistance between the thermal management components and the capture medium (and/or the internal support structure). Heat transfer surfaces (e.g., extended surfaces) can be in (conductive) thermal contact with both a thermal management component and an internal support structure component—such as a baffle and/or an internal mesh structure—and/or can be thermally coupled to the capture medium. Additionally or alternatively, a heat transfer surface can convectively transfer heat between an fluid within the interior (e.g., input fluid) and the internal support structure (e.g., by free and/or forced convection, depending on the mode of operation).

Heat transfer surfaces (e.g., extended surfaces) are preferably integrated into a structure of each baffle in the form of tabs (e.g., welded, bent, etc.), but can alternatively be welded or bonded to the thermal management component (e.g., welded perpendicular to a heating tube, integrated into the thermal management components (e.g., a flange formed into the structure of a heating tube), and/or otherwise integrated into the physical structure of the fluid chamber system. As an example, the baffles can be constructed from a flat sheet of metal, bending tabs out of plane (e.g., 90 degrees) and arranging them in conductive thermal contact with the thermal management component(s), thereby forming a set of heat transfer surfaces (e.g., extended surfaces). For example, each baffle preferably contacts each of the thermal management components (e.g., heated tubes) at a respective exterior, such as by direct abutment (e.g., compressive contact, thermal press fit), a thermal interface material (TIM), tab welding/brazing, and/or any other suitable mechanical contact/interface to facilitate conductive heat transfer.

However, the internal structure can include any other suitable heat transfer surface (e.g., extended surfaces). Additionally or alternatively, the baffles and/or mesh may directly function as heat transfer surfaces and/or extended surfaces (e.g., baffles transferring heat radially to the capture medium; mesh transferring heat axially away from the baffles and/or parallel to the thermal management component[s]). The mesh structures and/or baffles can define a set of extended surfaces and may function as extended-surface-heat-transfer components. For instance, where the capture medium is a bed of pellets/bead (e.g., Zeolite), the mesh structure and/or baffles may facilitate heat transfer between discrete capture media elements. Additionally or alternatively, in cases where the capture medium is a monolithic substrate (e.g., foam coated with microporous coating, zeolite matrix, etc.), mesh structures can be woven into and/or integrated with the monolithic substrate to facilitate heat flow through the substrate.

The internal structure(s) can facilitate any suitable net heat flow within the fluid chamber system to achieve and/or maintain a temperature of the capture medium within a target temperature range. As an example, an efficiency of the fluid chamber system (e.g., energy efficiency, carbon dioxide capture/regeneration efficiency, overall cost efficiency, etc.) can be optimized, during one or more periods of operation (e.g., capture/adsorption, desorption/regeneration, system heating, vehicle driving, vehicle idling, etc.), by maintaining the capture medium at a target temperature of: ambient temperature, less than 50 C, 50 C, 70 C, 80 C, 90 C, 100 C, 120 C, 150 C, 170 C, 180 C, 190 C, 200 C, 210 C, 220 C, 230 C, 240 C, 250 C, 260 C, 280 C, 300 C, 350 C, 400 C, 500 C, greater than 500 C, within any suitable open or closed interval bounded by any one or more of the aforementioned values, and/or at any other suitable target temperature(s).

In some variants, solid capture media may be thermally insulative and/or have relatively low thermal conductivity (e.g., thermal conductivity at least one order of magnitude less than the internal structure and/or thermal management components) and/or may establish poor thermal contact by virtue of random bed packing (e.g., low surface area to facilitate conductive heat transfer; less than 20% of the surface area of a given capture media element may be in contact with other elements; etc.). Accordingly, the heat flow to the capture media can be distributed to various capture media element through the internal support structure. For instance, where the spacing between adjacent baffles and/or mesh layers (e.g., the region width) is low (e.g., about 3-12 characteristic lengths of the capture media elements), the maximum number of capture media elements through which heat may flow to reach capture media elements (e.g., those most distal to the thermal management component) may be minimized (e.g., minimum-resistance heat flow path passes through less than N other capture media elements; minimizing a thermal gradient through the capture medium; an example is shown in FIG. 5B; etc.). In a specific example, a separation distance (e.g., minimum separation, largest/greatest separation of any individual point/element of the capture medium, etc.) between the solid microporous capture medium and the internal structure can be less than a threshold offset (e.g., 20 millimeters, 40 millimeters, etc.; wherein, in some examples, the threshold offset is determined based on a thermal conductivity of the solid microporous capture medium). In one example, this separation distance can be the largest minimum separation distance, which is defined as equal to the greatest distance selected from the set of all minimum separation distances between each portion of the capture medium and the internal structure. For example, the largest minimum separation distance could be determined by: first, for each point in the solid microporous capture medium, determining the minimum separation distance from that point to the internal structure (i.e., the distance from that point to whichever part of the internal structure is closest to the point); and then, from all those minimum separation distances, selecting the largest of them as the 'largest minimum separation distance'.

Figure 10:
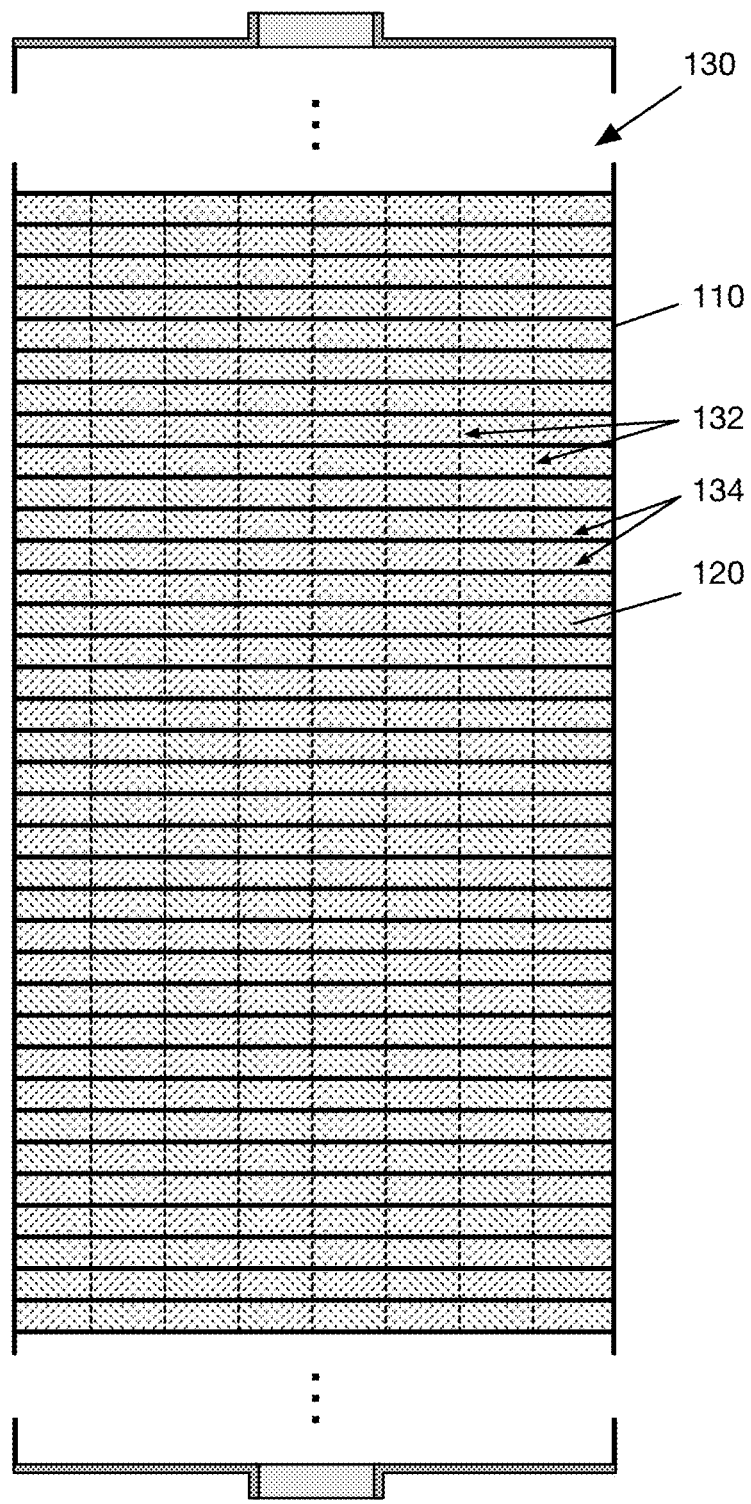
FIG. 10 is a partial cross-sectional view of a variant of the fluid chamber system.

The spacing between adjacent internal support structures (e.g., axially, radially; radial spacing between adjacent sections/coils of mesh; axial spacing between baffles; etc.) can be: less than 10 mm, 10 mm, 20 mm, 40 mm, 80 mm, 100 mm, 150 mm, 200 mm, 250 mm, 300 mm, greater than 300 mm, any open or closed range bounded by the aforementioned values, and/or any other suitable spacing. In a specific example, the internal support structure can include an array of at least 10 baffles (e.g., 50 baffles; an example is shown in FIG. 10), spaced about 25 mm apart along the primary axis. Likewise, the spacing between adjacent internal support structures can set relative to a number of characteristic lengths of the capture medium, which can be: less than 3, 5, 6, 8, 12, 18, 24, 36, greater than 36, any open or closed range bounded by the aforementioned values, and/or any other suitable number of characteristic lengths of the capture medium.

In variants, the internal support structure can be constructed from materials with high thermal conductivity (e.g., greater than 10 W/mK; greater than 100 W/mK; greater than 200 W/mK; higher than the thermal conductivity of the capture media; etc.), such as metals (e.g., aluminum, steel, etc.). The internal support structure (e.g., baffles) are preferably in direct (conductive) thermal contact with the thermal management component (e.g., a cylindrical outer surface of a heating tube), but can alternatively be thermally coupled via a thermal interface material (e.g., thermal paste; TIM; bonding agent with high thermal conductivity; etc.). In such variants, components of the internal support structure (e.g., baffles; mesh; etc.) can have a thickness of: less than 1 mm, 1 mm, 1.25 mm, 1.5 mm, 2 mm, 2.5 mm, 3 mm, 3.175 mm, greater than 3.175 mm, within any suitable open or closed interval bounded by any one or more of the aforementioned values, and/or any other suitable thickness. As an example, the thickness of the baffles can be selected based on a thermal optimization (e.g., minimum mass to achieve desired thermal properties).

Figure 3C:
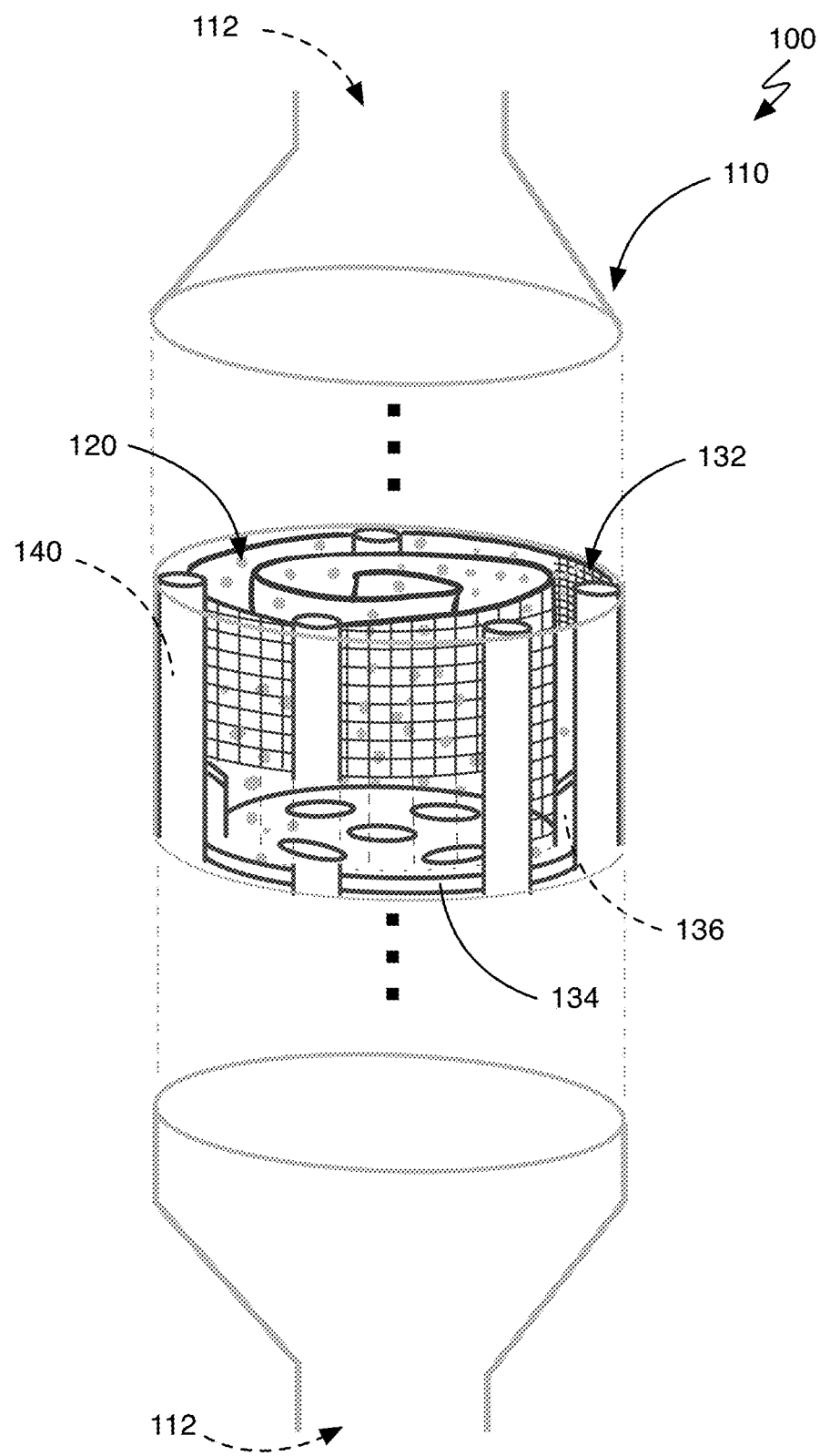
FIG. 3C is a partial isometric cutaway view representation of a variant of the fluid chamber system, which illustrates an example of an internal support structure.

Heat can flow directly from the thermal management component(s) to the capture medium, and/or may flow indirectly to the capture medium (e.g., through the internal support structure). In a first variant (e.g., an example is shown in FIG. 5B), heat may flow (e.g., during a heating mode of the thermal management component; during adsorption/regeneration; net heat flow following a path of decreasing temperature) from the thermal management component to a baffle (e.g., an extended surface thereof) and/or to each capture medium element in conductive thermal contact with the thermal management component; from the baffle to capture medium element in conductive thermal contact with the baffle and/or to each mesh layer in contact with the baffle; and internally within the capture medium elements (e.g., from higher-temperature elements to lower-temperature elements). In variants which include both baffles and a mesh (e.g., an example is shown in FIG. 3C), heat may additionally flow from the mesh to each capture medium element in conductive thermal contact with the mesh. Accordingly, the resulting temperature distribution across the capture medium may have a lower variance (and/or the capture medium may have a smaller temperature gradient) than would exist in absence of the internal structure.

In some variants, the internal support structure includes a set of extended-surface-heat-transfer components (which define one or more extended surfaces to facilitate heat transfer; an example is shown in FIG. 5B), each extended-surface-heat-transfer component in contact with a broad surface of a respective baffle of the plurality of baffles and protruding substantially orthogonal to the broad surface. As an example, the set of extended-surface-heat-transfer components can be integrated into a body of the respective baffle (e.g., bent or welded tabs, fins, etc.). Alternatively, the set of extended-surface-heat-transfer components can include a (metal) mesh structure. In some the metal mesh structure separates a first portion of the solid microporous capture medium from a second portion of the microporous capture medium.

However, the internal support structure can otherwise facilitate heat flow within the fluid chamber system.

However, the system can include any other suitable components.

In variants, the fluid chamber system can be used in conjunction with a method for carbon capture (e.g., mobile carbon capture) which can include: adsorbing a target species (and/or configuring the fluid chamber system to operate in an adsorption mode) and desorbing the target species (and/or configuring the fluid chamber system to operate in a desorption/regeneration mode). For example, the method for carbon capture can include one or more elements as described (e.g., regarding the 'method 200') in U.S. patent application Ser. No. 17/683,832, filed 1 Mar. 2022 and titled "SYSTEM AND METHOD FOR MOBILE CARBON CAPTURE", which is herein incorporated in its entirety by this reference. However, the fluid chamber system can additionally or alternatively be utilized in conjunction with any other suitable species capture, such as for dehumidification (e.g., capturing water using a desiccant as the capture medium), and/or in conjunction with any other suitable method processes. For example, carbon dioxide ($CO_2$) can be adsorbed from vehicle exhaust gas in the adsorption configuration, and subsequently desorbed by regenerating the capture media, allowing the $CO_2$ to be harvested and stored onboard the chamber. For example, the capture media can be regenerated by conditioning the capture media to achieve a target regeneration/desorption temperature (e.g., via the thermal management system; by heating the system via the thermal management components) in the desorption/regeneration mode and/or a secondary system can vacuum the carbon dioxide from the chamber in the desorption/regeneration mode, which may facilitate capture/storage of $CO_2$ onboard the vehicle. Additionally, variants of the method can utilize a plurality of fluid chambers systems 100 operating in different swing process modes, and alternate adsorption (and regeneration) between the plurality the fluid chambers to facilitate substantially continuous mobile carbon capture (e.g., from a continuous exhaust gas flow/stream; during an entirety of a driving cycle/period, etc.).

In variants, the system can include or be used with (e.g., mounted to) a mobile vehicle platform such as a Class 8 tractor (or semi-truck) or combination tractor-trailer. The fluid chamber system can be configured to connect to the vehicle exhaust pipe(s) (e.g., via an exhaust manifold and/or a fluid manifold) and/or to the tractor frame (e.g., between the rear of the cab and the fifth wheel), but can be otherwise suitably configured. However, the fluid chamber system can alternatively be utilized in any other suitable mobile and/or stationary applications (e.g., such as for a stationary combustion generator), and/or can be otherwise used.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A fluid chamber system for mobile carbon dioxide (CO2) capture from a vehicle exhaust manifold by a swing adsorption process, comprising:
    a chamber housing configured to mount to a vehicle, the chamber housing comprising:
        a chamber wall, the chamber wall defining a primary axis, a first end, and second end opposite the first end along the primary axis;
        an inlet port at the first end, the inlet port configured to be selectively connected to the vehicle exhaust manifold in an adsorption configuration; and
        an outlet port at the second end, the outlet port configured to selectively vent to an exterior environment in the adsorption configuration;
    a plurality of thermal management components comprising at least three tubes affixed to the chamber housing and arranged within the chamber housing between the first and second ends; and
    an internal support structure arranged within the chamber housing, the internal support structure defining a set of extended surfaces, the internal support structure comprising a plurality of baffles, wherein each baffle:
        spans an interior of the chamber housing and structurally stiffens the chamber housing,
        contacts each of the at least three tubes at a respective tube exterior, and
        defines a plurality of flow apertures which extend through a baffle thickness; and
    a solid microporous capture medium arranged within the interior, the solid microporous capture medium bounded by the chamber wall, the plurality of thermal management components, and the internal support structure.

2. The fluid chamber system of claim 1, wherein a thermal conductivity of the internal support structure is greater than a thermal conductivity of the solid microporous capture medium.

3. The fluid chamber system of claim 1, wherein the internal support structure further comprises a set of extended-surface-heat-transfer components, each extended-surface-heat-transfer component in contact with a broad surface of a respective baffle of the plurality of baffles and protruding substantially orthogonal to the broad surface, wherein the set of extended-surface-heat-transfer components define at least a portion of the set of extended surfaces.

4. The fluid chamber system of claim 3, wherein the set of extended-surface-heat-transfer components are integrated into a body of the respective baffle.

5. The fluid chamber system of claim 3, wherein the set of extended-surface-heat-transfer components comprises a metal mesh structure.

6. The fluid chamber system of claim 5, wherein the metal mesh structure separates a first portion of the solid microporous capture medium from a second portion of the solid microporous capture medium.

7. The fluid chamber system of claim 6, wherein, in the adsorption configuration, the inlet port is configured to receive an exhaust gas stream from the vehicle exhaust manifold, wherein the metal mesh structure is configured such that a mesh-proximal packing density of the solid microporous capture medium proximal a mesh boundary between the first and second portions of solid microporous capture medium is lesser than a nominal packing density associated with random packing of the solid microporous capture medium, thereby reducing at least one of axial and radial flow resistance along the mesh boundary relative to a reference resistance associated with random packing of the solid microporous capture medium.

8. The fluid chamber system of claim 7, wherein, in the adsorption configuration, a pressure drop within the exhaust gas stream is less than 10 kPA between the inlet port and the outlet port.

9. The fluid chamber system of claim 6, wherein the metal mesh structure is configured to dampen vibrations between the first and second portions of the solid microporous capture medium.

10. The fluid chamber system of claim 1, wherein a largest minimum separation distance between the solid microporous capture medium and the internal support structure is less than a threshold offset, wherein the threshold offset is based on a thermal conductivity of the solid microporous capture medium.

11. The fluid chamber system of claim 1, wherein the solid microporous capture medium comprises a plurality of media elements which define a media element geometry and a random packing density associated with the media element geometry, wherein a packing density of the solid microporous capture medium within a region is less than the random packing density.

12. The fluid chamber system of claim 11, wherein the solid microporous capture medium comprises a bed of solid microporous pellets or solid microporous beads.

13. The fluid chamber system of claim 1, wherein, each baffle of the plurality defines a respective plane, wherein, for each baffle of the plurality: in the respective plane, the at least three tubes are offset radially inwards from the chamber wall toward the primary axis and do not contact the chamber wall in the respective plane.

14. The fluid chamber system of claim 1, wherein each pair of adjacent baffles of the plurality of baffles defines a separation distance which is between 20 millimeters and 80 millimeters along the primary axis, wherein the plurality of baffles comprises at least ten baffles.

15. The fluid chamber system of claim 14, wherein the flow apertures of each pair of adjacent baffles of the set are unaligned.

16. A fluid chamber system for gas separation by a swing adsorption process, comprising:
    a chamber housing comprising a first and second port and defining a primary axis;
    a plurality of thermal management components affixed to the chamber housing and arranged within the chamber housing;
    an internal support structure, the internal support structure arranged within the chamber housing and forming a set of extended surfaces which are thermally coupled to the plurality of thermal management components, the internal support structure comprising:
- a plurality of baffles, each baffle defining a respective set of apertures that extend through a thickness of the baffle, wherein each adjacent pair of baffles of the plurality of baffles is configured to direct a combined axial-radial flow of an input gas relative to the primary axis, wherein each baffle of the plurality comprises a respective broad surface; and
- a set of internal support components in contact with and protruding from each baffle of the plurality of baffles at the respective broad surface of the baffle; and a capture medium arranged within a region bounded by the chamber housing, the plurality of thermal management components, and the plurality of baffles, wherein the capture medium thermally contacts both the internal support structure and the thermal management components.

17. A vehicle, comprising:
an exhaust manifold fluidly coupled with an engine; and
a fluid chamber system, comprising:
a chamber housing mounted to the vehicle, the chamber housing comprising:
- a chamber wall, the chamber wall defining a primary axis, a first end, and a second end opposite the first end;
- a first port selectively connected to the exhaust manifold so as to receive exhaust gas in an adsorption configuration of a swing adsorption process; and
- a second port;
- a plurality of thermal management components comprising a plurality of tubes arranged within the chamber housing between the first and second ends; and
- an internal support structure arranged within the chamber housing, the internal support structure defining a set of extended surfaces, the internal support structure comprising a plurality of baffles, wherein each baffle:
- spans an interior of the chamber housing and structurally stiffens the chamber housing,
- contacts each of the tubes of the plurality of tubes at a respective tube exterior, and
- defines a plurality of flow apertures which extend through a baffle thickness; and
- a capture medium arranged within the interior, the capture medium bounded by the chamber wall, the plurality of thermal management components, and the internal support structure.

18. The vehicle of claim 17, wherein the tubes of the plurality of tubes are offset radially inwards from the chamber wall relative to the primary axis in plane with each of a plurality of baffles.

19. The vehicle of claim 17, wherein the tubes of the plurality of tubes are arranged in parallel between a working fluid inlet and a working fluid outlet.

20. The vehicle of claim 17, wherein a first working fluid manifold is mounted or integrated into the first end of the chamber housing and a second working fluid manifold is mounted to or integrated into the second end of the chamber housing, the tubes of the plurality of tubes being fluidly coupled with the first working fluid manifold and the second working fluid manifold.

* * * * *